United States Patent [19]

Szczepanek

[11] Patent Number: 5,299,193
[45] Date of Patent: Mar. 29, 1994

[54] SIGNAL INTERFACE FOR COUPLING A NETWORK FRONT END CIRCUIT TO A NETWORK ADAPTER CIRCUIT

[75] Inventor: Andre Szczepanek, Bedford, England

[73] Assignee: Texas Instruments Incorporated, Dallas, Tex.

[21] Appl. No.: 874,250

[22] Filed: Apr. 24, 1992

[30] Foreign Application Priority Data

Feb. 28, 1992 [GB] United Kingdom ............... 92/04366

[51] Int. Cl.⁵ ........................................... H04L 12/40
[52] U.S. Cl. ................................... 370/85.1; 370/85.2; 370/85.3; 370/85.4; 370/85.5; 370/79
[58] Field of Search ...................... 370/79, 85.1, 85.2, 370/85.3, 85.4, 85.5

[56] References Cited

U.S. PATENT DOCUMENTS

| | | | |
|---|---|---|---|
| 4,225,919 | 9/1980 | Kyu et al. ..................... | 370/85.1 X |
| 4,571,675 | 2/1986 | Stambaugh et al. ............... | 395/200 |
| 4,646,232 | 2/1987 | Chang et al. ........................ | 364/200 |
| 4,674,086 | 6/1987 | Szczepanek et al. ............. | 370/85.5 |
| 4,777,591 | 10/1988 | Chang et al. ....................... | 395/800 |
| 4,803,485 | 2/1989 | Rypinski ......................... | 340/825.05 |
| 4,866,421 | 9/1989 | Szczepanek ..................... | 340/825.52 |
| 5,058,110 | 10/1991 | Beach et al. ..................... | 370/85.1 X |

Primary Examiner—Douglas W. Olms
Assistant Examiner—Russell W. Blum
Attorney, Agent, or Firm—Robert D. Marshall, Jr.; James C. Kesterson; Richard L. Donaldson

[57] ABSTRACT

A signal interface is provided for coupling a network front end circuit to a network adapter circuit, wherein the network front end circuit communicates with a network. The signal interface comprises a plurality of input signal lines, each operable to conduct an input signal from the network front end circuit to the network adapter circuit. The signal interface further comprises a plurality of output signal lines, each operable to conduct an output signal from the network adapter circuit to the network front end circuit. Selected ones of the input and output signal lines are functional to support both a first and second network protocol on the same line. Further, only input signals are input on the selected input lines and only output signals are output on the selected output lines.

13 Claims, 7 Drawing Sheets

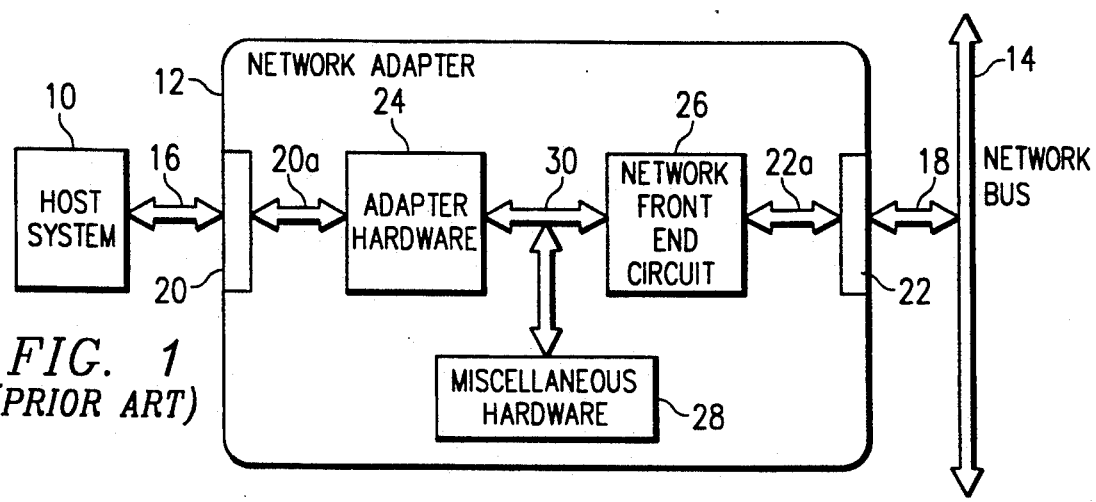
FIG. 1 (PRIOR ART)
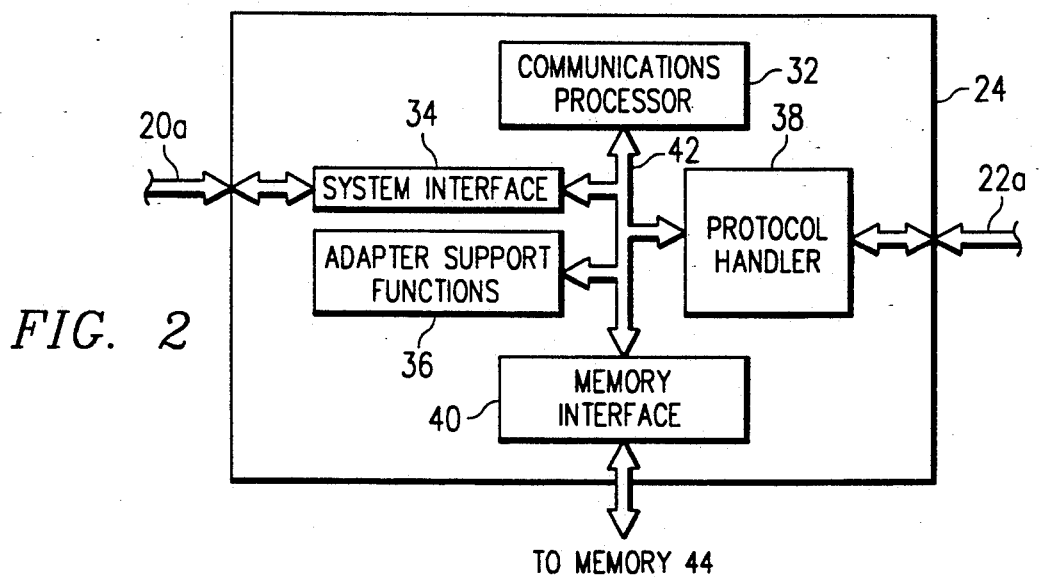
FIG. 2
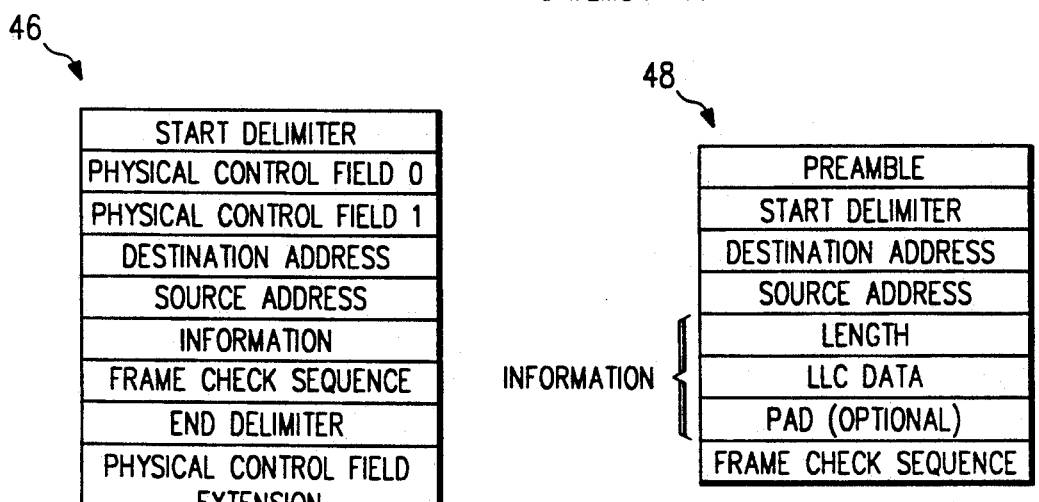
FIG. 3a
FIG. 3b

FIG. 5

Top side (pins 116–84, left to right):
- 116 VSSC
- 115 MRAS-
- 114 MW-
- 113 MCAS-
- 112 MAX2
- 111 MAX0
- 110 MDDIR
- 109 VDD02
- 108 SYNCIN-
- 107 OSCIN-
- 106 VSS02
- 105 MROMEN-
- 104 MACS-
- 103 MAL-
- 102 MREF
- 101 MBIAEN-
- 100 VDDL
- 99 MRESET-
- 98 MBCLK2
- 97 MBCLK1
- 96 FEOSC
- 95 FERXD/FERCVR
- 94 FERXC/FERCLK
- 93 OUT1
- 92 FETXC-/PXTALIN
- 91 VSS01
- 90 FETXEN/FEWRAP-
- 89 FEDRVR
- 88 FEDRVR-
- 87 FECOLL/FEWFLT-
- 86 FELPBK-/FENSRT-
- 85 FETXD/FEFRAQ
- 84 FECSN/FEREDY- Left side (pins 117–17, top to bottom):
- 117 VSSI
- 118 MOE-
- 119 MBEN-
- 120 MADH7
- 121 MADH6
- 122 MADH5
- 123 MADH4
- 124 VDD03
- 125 VSS03
- 126 MADH3
- 127 MADH2
- 128 MADH1
- 129 MADH0
- 130 MAXPH
- 131 MBRQ-
- 132 MBGR-
- 1 VSS04
- 2 MAXPL
- 3 MADL7
- 4 MADL6
- 5 MADL5
- 6 MADL4
- 7 MADL3
- 8 MADL2
- 9 MADL1
- 10 MADL0
- 11 EXTINT3
- 12 EXTINT2
- 13 EXTINT1
- 14 EXTINT0
- 15 NMI-
- 16 VDD04
- 17 VSSL Bottom side (pins 18–50, left to right):
- 18 VDDL
- 19 CLKDIV
- 20 VSSC
- 21 OUT0
- 22 PRTYEN/SCAN0
- 23 BTSRP
- 24 SIACK-
- 25 SRESET-
- 26 SRS1
- 27 SRS0
- 28 SRSX
- 29 SCS-
- 30 SBRLS-
- 31 SBBSY-
- 32 S8/SHALT-
- 33 SRS2/SBERR-
- 34 VDDL
- 35 SI/M-
- 36 SINTR/SIRQ-
- 37 SHLDA/SBGR-
- 38 SDDIR
- 39 SRAS-/SAS-
- 40 SWR-/SLDS-
- 41 VSSI
- 42 SXAL
- 43 SALE
- 44 SBCLK
- 45 SADL7
- 46 SADL6
- 47 SADL5
- 48 SADL4
- 49 SADL3
- 50 VDD05

Right side (pins 83–51, top to bottom):
- 83 VSSL
- 82 VDD01
- 81 XMATCH
- 80 XFAIL
- 79 TEST0
- 78 TEST1
- 77 TEST2
- 76 TEST3
- 75 TEST4
- 74 TEST5
- 73 SADH0
- 72 SADH1
- 71 SADH2
- 70 SADH3
- 69 SADH4
- 68 SADH5
- 67 VSS06
- 66 VDD06
- 65 VSSC
- 64 SADH6
- 63 SADH7
- 62 SPH
- 61 SRD-/SUDS-
- 60 SRDY-/SDTACK-
- 59 SOWN-
- 58 SDBEN-
- 57 SBHE-/SRNW
- 56 SHRQ/SBRQ-
- 55 SPL
- 54 SADL0
- 53 SADL1
- 52 SADL2
- 51 VSS05

SIGNAL INTERFACE FOR COUPLING A NETWORK FRONT END CIRCUIT TO A NETWORK ADAPTER CIRCUIT

TECHNICAL FIELD OF THE INVENTION

This invention relates in general to digital communications, and more particularly to a signal interface for coupling a network front end circuit to a network adapter circuit.

BACKGROUND OF THE INVENTION

As computer technology has increased, the use of computer networks has become very popular and common. Indeed, computer networks are used in all types of businesses, industries and institutions. With the advancements of technologies, two types of computer networks have become the most prominent in the network market. These two types include a token ring network and a network known by the trademark "ETHERNET". At the present time, it is estimated that approximately ninety percent of the local area network market is made up of either token ring or "ETHERNET" networks. Thus, in most instances, a series of personal computers or work stations are connected to either a token ring or an "ETHERNET" local area network ("LAN") so that each of the respective processors of those devices may communicate with one another along the LAN. Various other peripherals, such as file servers, dedicated processors or printers may be likewise connected to the LAN for purposes known in the art.

With the advanced use of networks, there has existed a need for both a physical and electrical interface to connect each of the respective peripheral devices to the chosen network. The particular type of interfacing configuration chosen, however, has until now been dependent upon, not only the type of network chosen, but also the specific type of communication medium used by the network. For example, in contemporary technology, token ring networks may utilize one of nine different combinations of token ring protocol and communication media. Similarly, "ETHERNET" networks may utilize at least one of three different types of communication media. As a result, it has until now been necessary for a user to select some type of interfacing configuration which not only is network protocol specific (i.e., either specific to the particular "ETHERNET" or token ring protocol), but accommodates the particular communication medium associated with the network as well.

In view of the above, computer manufacturers or users have been forced to configure their networked computers to accommodate the specific network and communication medium used by the network. Thus, in the example of personal computers, a computer manufacturer may configure the hardware of a personal computer in order to interact with a particular type of network as well as the communication medium of the network. In the prior art, this configuration was typically accomplished at the protocol level by supplying sufficient chips on either the motherboard or a card within the personal computer. Additionally, a particular type of mechanical connector was supplied on the cabinet of the personal computer or at the exterior end of a computer card so that the connector is compatible with the type of communication medium implemented by the network.

As an example of the prior art, in order to accommodate an "ETHERNET" network which implements a coax (AUI) medium, an interface card is chosen having "ETHERNET" circuitry, and a MIL-C-24308-1972 type of connector is attached to the cabinet of the personal computer, or affixed to one of the interface cards. These provisions permit the computer to be physically connected to the coax medium of the "ETHERNET" network. Once this configuration is accomplished, however, it should be appreciated that the computer is dedicated to the specific coax communication medium and cannot immediately be used with other types of networks and/or cabling media. Thus, if the user of a computer which has been configured for the example above desires to change to an "ETHERNET" network using a thinnet cabling medium, the computer must be reconfigured in order to accommodate the new type of medium in the alternative network. This reconfiguration is commonly accomplished by replacing the interface card in the computer. As yet another limitation of the prior art, if the user of the computer in the example above desires to connect the computer to a token ring network as opposed to the "ETHERNET" network, then either the card having the "ETHERNET" support must be replaced or, if the motherboard has been previously configured to communicate with an "ETHERNET" protocol, then it must be modified in order to now accommodate the token ring protocol.

Therefore, from the above, it may be appreciated that there exists a need for an interfacing scheme which permits a computer or like peripheral device to be interfaced to either an "ETHERNET" or token ring network with minimum hardware change, mechanical complexity and financial burden on the user of the computer. Additionally, there exists a need to provide flexibility in accommodating various of communication media associated with either "ETHERNET" or token ring network systems.

SUMMARY OF THE INVENTION

In accordance with the present invention, an electrical interface for coupling a network front end circuit to a network adapter circuit is provided which substantially eliminates or reduces disadvantages and problems associated with prior techniques for interfacing network peripheral devices to ethernet and token ring networks.

A signal interface is provided for coupling a network front end circuit to a network adapter circuit, wherein the network front end circuit communicates with a network. The signal interface comprises a plurality of input signal lines, each operable to conduct an input signal from the network front end circuit to the network adapter circuit. The signal interface further comprises a plurality of output signal lines, each operable to conduct an output signal from the network adapter circuit to the network front end circuit. Selected ones of the input and output signal lines are functional to support both a first and second network protocol on the same line. Further, only input signals are input on the selected input lines and only output signals are output on the selected output lines.

The present embodiments provide numerous technical advantages over the prior art. For example, one technical advantage is the inclusion of circuitry which minimizes the possibility of network interference during start-up operations of a host device. A second technical advantage is the ability to easily reconfigure a peripheral network device to accommodate a different type of network or network media with minimal hardware change and, thus, minimal effort and cost to the user. Yet another technical advantage is the flexibility in providing a defined interface which permits future development of devices external to the peripheral device which can communicate with the peripheral device through the interface without having to readjust or reconfigure the hardware within the peripheral device.

Numerous other advantages are readily apparent to one skilled in the art and/or are set forth in the following description, claims and figures.

BRIEF DESCRIPTION OF THE DRAWINGS

For a more complete understanding of the present inventive embodiments and the advantages thereof, reference is now made to the following description taken in conjunction with the accompanying drawings in which:

FIG. 1 illustrates a block diagram of a host system coupled to a computer network bus via a network adapter;

FIG. 2 illustrates a block diagram of the adapter hardware block of FIG. 1;

FIG. 3a illustrates a data frame format for token ring protocol;

FIG. 3b illustrates a data frame format for ethernet protocol;

FIG. 5 illustrates a pin out diagram of the preferred adapter hardware block of FIG. 1;

DETAILED DESCRIPTION OF THE INVENTION

Figure 4A:
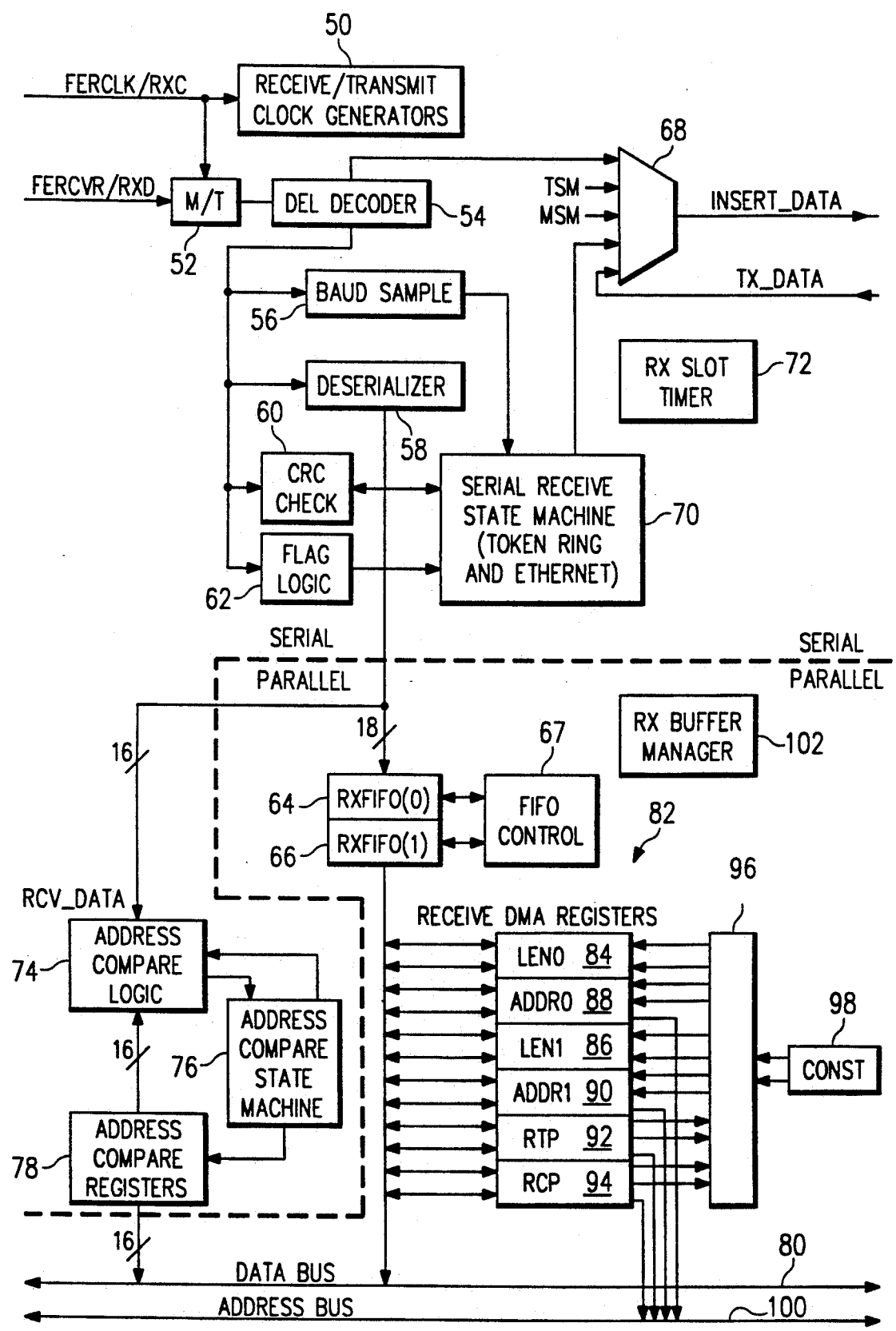
FIGS. 4a-4c illustrate a block diagram of the protocol handler of FIG. 2.

The preferred embodiments of the present invention are illustrated in FIGS. 1-7 of the drawings, like numerals being used to refer to like and corresponding parts of the various drawings.

FIG. 1 illustrates a prior art configuration which serves to depict the various components relating to the present invention in a generalized fashion. In particular, FIG. 1 illustrates a host system 10, a network adapter 12 and a network bus 14. In the embodiment of FIG. 1, host system 10 is typically a computer based system or peripheral, while bus 14 is representative of any type of computer network. Additionally, while FIG. 1 illustrates only a single host system adapted to a network, a series of different host systems could be similarly provided so that each share the common network and are operable to communicate with one another.

Host system 10 is coupled via a bus 16 to network adapter 12. Additionally, network adapter 12 is coupled via a bus 18 to network bus 14. Network adapter 12 includes two interfaces, namely an interface 20 for connecting network adapter 12 to host system 10 and an interface 22 for connecting adapter 12 to network bus 14. Network adapter 12 further includes internal buses 20a and 22a for coupling interfaces 20 and 22, respectively, to the internal components of network adapter 12. Accordingly, it should be appreciated that communications may be made between host system 10 and network bus 14 via buses 16, 18, 20a, 22a and through network adapter 12. Thus, network adapter 12 "adapts" host system 10 to communicate with network bus 14.

The illustration of FIG. 1 represents generally a common prior art mechanism by which a computer host system is connected to a network. For example, host system 10 may comprise a personal computer, while network bus 14 may be representative of many different types of networks. As discussed below in connection with the preferred embodiments, the present embodiment is tailored to accommodate token ring or ethernet local area networks ("LANs"). While networks other than token ring and "ETHERNET" are available, it is estimated that at least 90% of the LANs in today's marketplace comprise either token ring or ethernet technologies.

Network adapter 12 is further illustrated as having three general internal components. In particular, adapter 12 includes an adapter hardware block 24, a network front end circuit 26 and a miscellaneous hardware block 28. Adapter hardware block 24, network front end circuit 26 and miscellaneous hardware 28 are connected generally by an internal bus system 30. As a result, the three components may interact in order to permit communication between host system 10 and network bus 14. Thus, data on network bus 14 may be retrieved through bus 18, interface 22 and bus 22a into network front end circuit 26. Thereafter, this data may be processed by the components of adapter 12, and ultimately transferred to host system 10 via bus 20a, interface 20 and bus 16. Naturally, the opposite transfer of data from host system 10 to network bus 14 is equally achievable.

The particular functions of adapter hardware block 24, network front end circuit 26 and miscellaneous hardware 28 may be further characterized in terms of both the prior art and in terms of the present inventive embodiments. In particular, the prior art includes certain configurations embodied in U.S. Patents and pending patent applications assigned to Texas Instruments Incorporated. Accordingly, the following United States issued patents and pending applications are incorporated by reference as though set forth fully herein.

| ISSUED PATENTS | | |
|---|---|---|
| Patent No. | Title | Filing Date |
| 4,866,421 | Communication Circuit Having an Interface for External Address Decoding | September 12, 1989 |
| 4,777,591 | Microprocessor with Integrated CPU, RAM, Timer and Bus Arbiter for Data Communications Systems | October 11, 1988 |
| 4,674,086 | Token Ring Access Control Protocol Circuit | June 16, 1987 |
| 4,646,232 | Microprocessor with Integrated CPU RAM Timer Bus Arbiter Data for Communications System | February 24, 1987 |
| 4,571,675 | Microprocessor Device with Integrated Auto Loaded Timer | February 18, 1986 |

| PENDING U.S. PAT. APPLICATIONS | | |
|---|---|---|
| Serial No./ Docket No. | Title | Filing Date |
| 07/446505/ | Data Transfer Apparatus | December 5, 1989 |

-continued

| Serial No./ Docket No. | PENDING U.S. PAT. APPLICATIONS Title | Filing Date |
|---|---|---|
| TI-13284 | and Methodology | |
| 07/445066/ TI-14613 | Communcations Processor System with Control of Downloaded Tasks | December 4, 1989 |
| 07/446019/ TI-12952 | Data Communication System | December 5, 1989 |
| 07/446352/ TI-13015 | Data Prioritizing System | January 16, 1990 |
| 07/445562/ TI-12940 | Digital Processor | December 5, 1989 |

FIG. 2 illustrates a block diagram of adapter hardware block 24 shown in FIG. 1. In particular, adapter hardware block 24 in the preferred embodiment is a single local area network processor adapter chip 24. The processor device of the present embodiment was derived from a single chip token ring communications processor device commercially available from Texas Instruments and identified as the TMS380C16 token ring commprocessor. In particular, adapter chip 24 presents in general the same component blocks existing in the TMS380C16. However, the device has been greatly upgraded and improved such that it maybe used in the configuration of FIG. 1 in order to permit communication with either a token ring network or an "ETHERNET" network, whereas its predecessor device communicated solely with token ring networks. As described in connection with FIGS. 6 and 7, below, adapter chip 24 may be utilized in an alternative, inventive physical configuration to support the various types of communication media used with either token ring of ethernet protocols.

By improving upon a predecessor device, the present adapter chip 24 provides numerous benefits previously provided by the TMS380C16, as well as additional benefits. Some of the benefits previously available by the TMS380C16 are as follows. First, by providing a single chip solution having protocol handling, host system interfacing, memory interfacing and communications processing, only adapter memory and minimal additional components such as an oscillator (i.e., miscellaneous hardware 28) need be added to completely interface a host system to a network. Further, a TMS380C16 provides a 32 bit system memory address reach with a high speed bus master DMA interface to support rapid communications with the host system. In addition, the TMS380C16 supports direct I/O and a low cost 8-bit pseudo-DMA interface that requires only a chip select to work directly on an 80×8×8 bit slave I/O interface. Finally, selectable Intel 80×8× or Motorola 68×X× type bus and memory organization permit additional design flexibility.

The TMS380C16 also supports addressing for up to 2 megabytes of memory. This expanded memory capacity improves adapter performance by minimizing the frequency of host system to network adapter communications by allowing larger blocks of information to be transferred between the two at one time. This support of a large amount of interfacing memory is important in applications that require large data transfers such as graphics or data base transfers and/or in heavily loaded networks where the extra memory can provide data buffers to store data until it can be processed by the host.

The TMS380C16 also includes a proprietary communications processor ("CPU") which allows protocol software to be downloaded into RAM or stored in RAM and the device memory space. These downloadable protocols are more fully described in U.S. patent application 07/445,066 incorporated hereinabove. By moving protocols to the chip, system performance is increased. This is accomplished due to the off loading of processing from the host system to the TMS380C16 which may also reduce adapter to host communications.

The TMS380C16 also includes hardware counters that provide real time error detection and automatic frame buffer management. These counters control system bus retries and burst size, and also track the host and adapter buffer status. Previously these counters were maintained in software, but by integrating them into hardware, software overhead is removed and adapter interfacing is improved.

Returning to FIG. 2, adapter chip 24 is illustrated for purposes of explanation as having five internal functional blocks. In particular, these blocks include a communications processor 32, a system interface 34, an adapter support functions block 36, a protocol handler 38 and a memory interface 40. Memory interface 40 is coupled to a memory (not illustrated) for purposes of storing/retrieving information. Each of the internal blocks of adapter chip 24 may communicate with one another via an internal system bus 42. While processor chip 24 is illustrated as having these five blocks, it should be understood that such presentation is given merely by way of example. Thus, each of the respective functions of the five blocks could be accomplished by circuitry selected by one skilled in the art in a manner that is not necessarily separated into five different blocks. Accordingly, the explanation of adapter device 24 as having five blocks is not intended to limit the scope of the present embodiment.

As discussed above, the five blocks illustrated within adapter chip 24 have been used for describing the previously existing TMS380C16 available from Texas Instruments. The present embodiment, however, provides various improvements to selected ones of the blocks in order to provide still additional technical advantages from the adapter chip as a whole and, in order to permit the chip to communicate not only with a token ring protocol but with "ETHERNET" protocols as well. In particular, the key improvements for purposes of permitting communication with either token ring or "ETHERNET" networks have been made primarily to protocol handler 38. Accordingly, basic descriptions are given below for each of the five component blocks, and particular emphasis and description is made with respect to the features of protocol handler 38.

In general, the operation of the five internal components of adapter chip 24 are as follows. Adapter chip 24 contains a cached workspace register architecture communications processor 32. The use of a cached workspace register file improves performance because the simplest instructions require only one memory cycle if their operands are in cache. Communications processor 32 controls adapter operation, runs diagnostic tests and responds to system interrupts. Additionally, the code running in communications processor 32 implements the frame level media access control ("MAC") protocols required by token ring protocols.

Protocol handler 38 is responsible for network access, data framing and deframing and cyclic redundancy checking ("CRC") functions. The protocol handler also provides the network specific status and control required by either token ring or "ETHERNET" standards. Further protocol handler 38 serializes and deserializes network data and implements the token ring and ethernet local area network protocols at the bit and frame levels. When receiving information, protocol handler 38 deserializes data coming from the network and transfers it to adapter memory 44 as a linked list of buffers. When transmitting data, protocol handler 38 takes data from adapter memory 44, converts it to serial form and sends it to the network by way of the network front end circuit 26 illustrated in FIG. 1, above.

Protocol handler 38 is also responsible for controlling the flow of data to and from RAM (not shown). Specifically, protocol handler 38 includes intelligent DMA controllers for automatically chaining between buffers for consecutive DMA operations. Four DMA state machines are maintained, the receive and transmit sides each having a state machine for data DMA and buffer manager DMA. The buffer manager DMA state machines reinitialize the data DMA state machines for reception or transmission and automatically step down chains of such buffers as each is filled. This is done fast enough to guarantee availability of a state machine even if frames appear back-to-back on the network. Protocol handler 38 interrupts communications processor 32 at the end of a frame, end of a buffer, or when it reaches the end of a buffer chain.

As stated above, the key inventive changes and improvements to adapter chip 24 have mostly been made with respect to protocol handler 38. In general, additional protocol logic has been included within protocol handler to permit it to accommodate both token ring and "ETHERNET" protocols. The particular details of these and other improvements to protocol handler 38 are discussed in greater detail in connection with FIGS. 4a-4c, below.

System interface 34 interfaces host system 10 shown in FIG. 1 to adapter chip 24. Additionally, system interface 34 controls direct memory access ("DMA") operations between host system 10 and memory 44. Further, system interface 34 enables host system 10 to gain direct access ("DIO") to memory 44.

System interface 34 includes two separate controllers (not separately illustrated). The first controller is a direct I/O controller. The direct I/O controller manages host system references to the controller registers presented by adapter chip 24. The second controller is a system DMA controller. This controller performs DMA transfers between host system 10 and the data bus of adapter chip 24. Software uses these mechanisms to enable host 10 and adapter chip 24 to communicate with each other.

The terms "DIO" and "SDMA" refer to the data transfer mechanisms as seen from the host system side. The "DIO" registers appearing on the host system bus should not be confused with the registers appearing in the adapter memory map.

For DIO, adapter chip 24 appears to host system 10 as a set of 16 consecutive byte addresses aligned on a 16-byte boundary. The DIO registers give host system 10 access to adapter memory for down loading code, make adapter status information available to host system 10 and allow host system 10 to control adapter chip 24.

During host system reads or writes to adapter memory 44 (DIO), communications processor 32 is locked out of adapter memory 44. With this approach, command and status task blocks may be written by host system 10 and asynchronously examined by communications processor 32. The direct I/O controller also places a programmable interrupt vector on the system bus during system bus interrupt acknowledge cycles.

System interface 34 also allows for communications processor 32 to initiate DMA between adapter memory 44 and memory associated with host system 10, for frame data or command/status interchange. It should be noted in the preferred embodiment that DMA is completely under control of adapter chip 24. System interface 34 also includes a CMD/STS register. If host system 10 needs to send a frame, it generates an interrupt to adapter chip 24 by writing to the AIRQ bit of the CMD/STS register. From this point on, software associated with the adapter chip 24 controls transmission.

Memory interface 40 includes a controller for internal system bus 42 and provides an interface and control function to memory 44 (not shown). Additionally, memory interface 40 includes a parity checker and generator, memory mapping registers, bus arbitration logic and clock generators. Memory interface 40 acts as the controller and arbiter for internal system bus 42. In the preferred embodiment, it also provides a flexible bus interface allowing a 2M byte memory of DRAM, SRAM or EPROM to be used as memory 44, thereby providing a low chip count at low cost. Memory interface 40 also contains the code, data, stack and buffer mapping registers which are used to increase the logical address space of communications processor 32 to 2M bytes.

Adapter support functions block 36 includes the remaining features of adapter chip 24. Adapter support functions block 36 is preferably separated from the remaining adapter chip functions in order to make testing easier. In particular, adapter support functions block 36 contains a general purpose timer, an interrupt prioritizer and multiplexer, a DRAM refresh controller and certain selected registers for adapter control and status.

Before proceeding with the particular structures and methodologies of the present embodiments, it is instructive to examine the frame formats for both token ring and ethernet communications. A frame format represents a packet of data which is transmitted along the network, and which commonly includes information transmitted from one network peripheral to another so that the latter can operate or perform some task in response to the information. Because the preferred embodiments pertain to token ring and ethernet networks, FIGS. 3a and 3b illustrate the formats for a frame of data for token ring and ethernet communications, respectively.

FIG. 3a illustrates a token ring data frame 46. Frame 46 commences with a start delimiter. The start delimiter indicates the beginning of a frame and includes an eight bit sequence which when recognized indicates the commencement of a frame. Following the start delimiter is a physical control field zero. The physical control field zero includes one byte of information which is broken down into four sets of bits, where each set provides a different type of indication. In particular, bits zero through two indicate the priority level of the token. Bit three of physical control field zero is the token indicator. It is set to one for a busy token and to zero for a free token. Bit four of physical control field zero is the monitor count bit. When the monitor station is in repeat mode and receives a frame that is not a normal free token, it examines the monitor count bit. If this bit is zero, the monitor repeats the token with a monitor count bit set to one. If this bit is one, a token error has been detected. Bits five through seven of physical control field zero are the priority reservation bits. These bits are used in fairness algorithms implemented to request a non-normal free token of a particular priority.

A physical control field one follows physical control field zero. Physical control field one, like physical control field zero, includes various sets of bits where each set of bits provides a different type of indication. For example, adapter chip 24 discussed above will recognize two different types of token ring frame formats. The first two bits of physical control field one indicate which of the two types of frame formats are being provided. The first format provides for cyclical redundancy checking ("CRC") on the frame address portion of a frame (the so-called frame "header") and the data portion as well. The second type of format is an escape format. The escape format is provided for future frame formats and allows the redefinition of any frame field between the first two bits of physical control field one and the end delimiter discussed below.

The destination address and source address follow the physical control fields within token ring frame 46. The destination and source addresses follow the start delimiter. The destination address field is a 48 bit address which specifies the station(s) for which the frame is intended. The source address is the unique address of the station sending the frame.

An information field follows the destination and source addresses. The information field contains the pertinent information which is typically operated on by any one of the stations along the network. A minimum information field of one byte must be transmitted in every frame, but it should be noted that several bytes of information could be included as well. These bytes of information may, therefore, be processed by a host system 10 for whatever computing purpose is desired (e.g., sending a text message from one host to another; sending information to a printer for printing).

Following the information is a frame check sequence as well as an end delimiter. The frame check sequence provides for error checking to ensure that the information was correctly received. The end delimiter indicates that the end of the frame has been transmitted and received. Following the end delimiter is a one byte physical control field extension which is the same for all frame formats. Physical control field extension provides further functions such as data and address acknowledgement for MAC frames.

In accordance with IEEE 802.5 (i.e., token ring) standards, a free token format may also be transmitted in lieu of token ring format 46. The free token format simply includes a start delimiter followed by a physical control field and concludes with an end delimiter. These three bytes of information have particular settings designated by the IEEE in order to indicate that a free token is being transmitted around the network.

FIG. 3b illustrates an ethernet network frame 48. Frame 48 includes eight different subcomponents, many of which are comparable to those discussed above in connection with token ring frame 46. In particular, frame 48 begins with a preamble. Specifically, an ethernet network has no "master" clock, so frames must always be preceded by a preamble to allow receiving stations to lock onto the transmitting station's clock. The preamble is followed by a start delimiter which is a data pattern that differentiates the start of frame from the preamble, and is used by the receiver to synchronize itself to the start of the frame. Moreover, the preamble is specified to consist of 56 alternating ones and zeroes while the start delimiter is a binary 10101011 pattern. Thus, the start delimiter is effectively a byte of preamble with a one in its last bit. Thus, a receiver must look for a sequence of preamble followed by 11 to synchronize itself to an incoming frame. A transmitter must always send the full preamble and start delimiter, but a MAC receiver will never see the preamble in full; some of the preamble will be lost in the time taken to lock onto the transmitters clock in the receiving station. Similar losses occur in network segment repeaters, so the preamble actually seen by a MAC receiver will be reduced. This loss is anticipated and acceptable, so long as the receiver fully locks onto the incoming frame before the end of the start delimiter is encountered.

The information in an ethernet frame follows the source address. Like token ring, the information is the data that the receiving station(s) operates in response to. The specification of the information field differs between bluebook ethernet and IEEE 802.3 ethernet. In bluebook ethernet, the information consists of a type field of two bytes followed by LLC data. In IEEE 802.3 ethernet, the information consists of a two byte length field, a data field, and padding if necessary. The present embodiment makes no assumptions as to the contents of the data field, on transmission or reception. Both bluebook and IEEE 802.3 standards specify that the data field has minimum length of 48 bytes and a maximum length of 1502 bytes. These lengths translate to a minimum frame size of 64 bytes, and a maximum frame size of 1518 bytes. As the ethernet slot size is 512 bit times, frame fragments due to collisions will always be less than 64 bytes in length. Receivers can therefore use frame length to filter out these unwanted transmissions.

A frame check sequence follows the ethernet information. This field includes a CRC field which holds a 4 byte cyclic redundancy checksum calculated over the address and data fields of the frame. The algorithm used is common to all IEEE 802 MAC layers. It should also be noted that there is no end delimiter on an ethernet frame. The end of a frame is marked by the absence of a carrier sense signal (CRS) on the network. A frame should however end on a byte boundary, and this leads to the concept of a dribble error. A frame has a dribble error if CRS is not deasserted on a byte boundary. Dribble errors are generally discounted if the CRC was correct on the previous byte boundary.

Figure 4B:
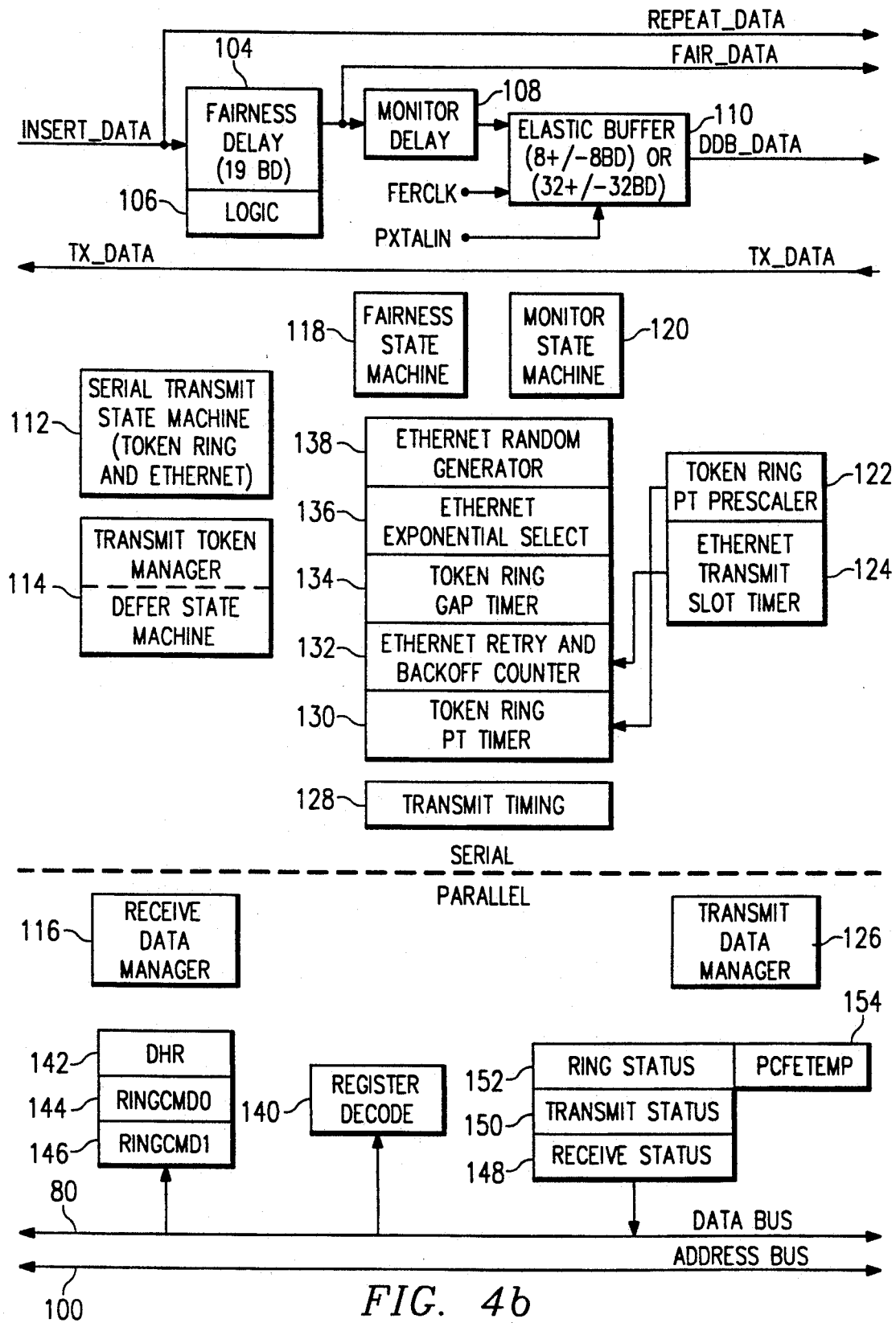
Figure 4C:
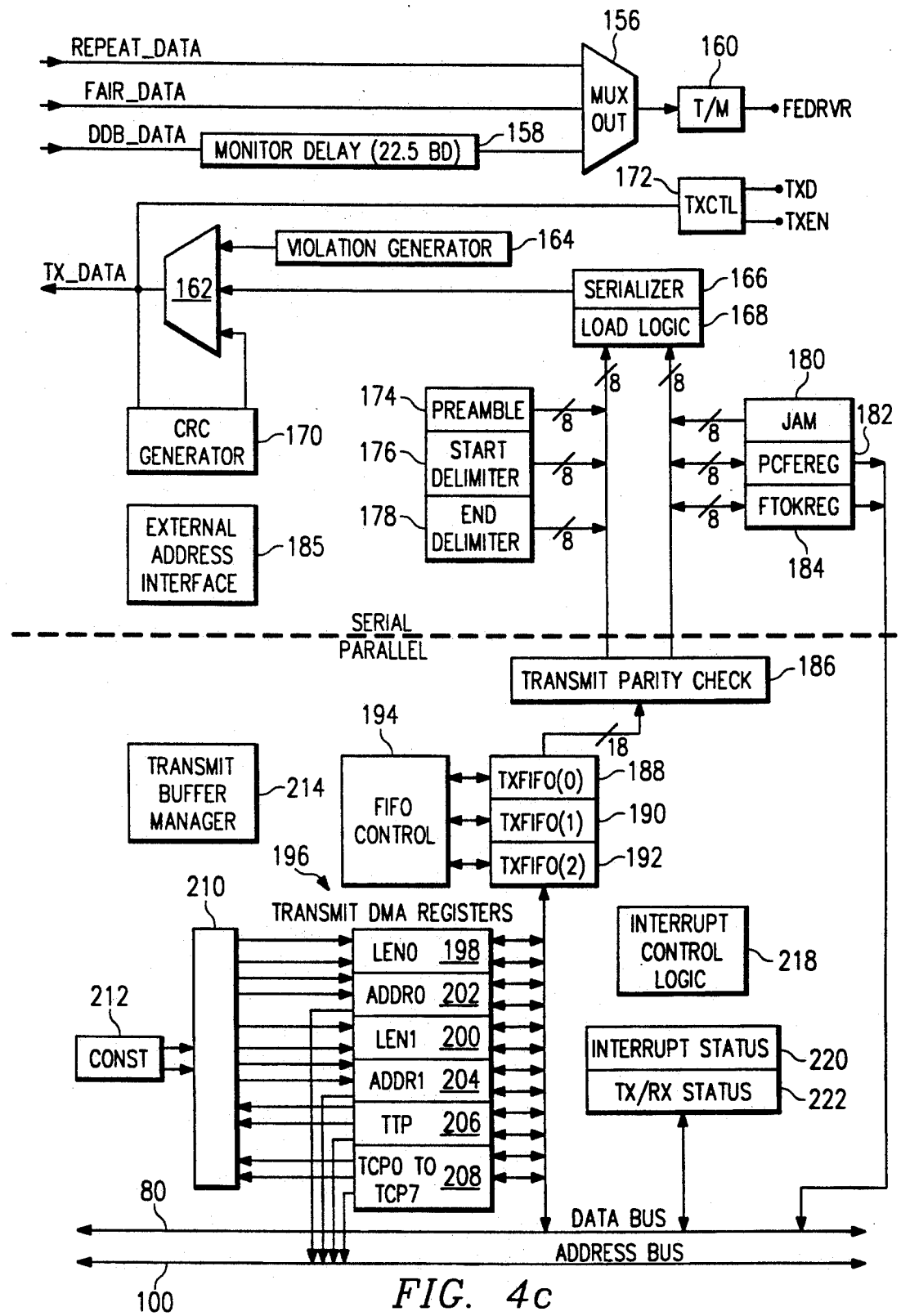

FIGS. 4a-4c illustrate a functional block diagram of protocol handler 38 illustrated in FIG. 2. The blocks within FIGS. 4a-4c perform the various functions of the protocol handler and generally are separated into a serial data side and a parallel data side. More specifically, data received from either a token ring or ethernet network is received in serial form and converted to parallel form for operation within network adapter 12 or for communication to host system 10. The dotted line illustrated in FIGS. 4a-4c delineates generally between serial and parallel functions, the blocks below the dotted line for performing parallel functional operations and the remaining blocks for performing serial operations. As stated above, various inventive features have been added to protocol handler 38 so that adapter chip 24 may communicate with ethernet protocols as well as token ring protocols. Accordingly, these additional ethernet functions are described below.

With reference to FIG. 4a, the FERCLK/RXC signal is input into a receive/transmit clock generators block 50. This input signal is further used to control a Manchester-to-transitional decoder ("M/T") block 52. M/T block 52 receives as an input the FERCVR/RXD signal. The output of M/T block 52 is connected to the input of a delimiter decoder 54. Delimiter decoder 54 has three outputs. The first output is connected to the input of a baud sample latches block 56, a deserializer 58, a CRC checker 60 and a flag logic block 62. In addition, deserializer 58 passes these 18 bits of data to a first of a pair of receive FIFO buffers 64 and 66. Receive FIFO buffers 64 and 66 are connected to a FIFO controller 67 described in greater detail, below.

The third output of delimiter decoder 54 is connected to one of the five inputs of a data insertion multiplexer 68. Multiplexer 68 also receives at two of its inputs the STSM (serial transmit state machine) and MSM (monitor state machine) signals respectively. A fourth input to multiplexer 68 is the output of a serial receive state machine 70. The final input of multiplexer 68 is connected to receive the TX_DATA signal. The TX_DATA signal is received from circuitry discussed below in connection with FIG. 4c. Additionally, multiplexer 68 provides an output signal INSERT_DATA which is provided to circuitry discussed below in connection with FIG. 4b. Serial or receive state machine 70 also receives input signals from baud sample latches block 56, CRC checker 60 and flag logic block 62. A receive slot timer 72 is also associated with serial receive state machine 70 for serving the function of ensuring ethernet received frames are at least 64 bytes long.

Sixteen bits of information from the 18 bit data output of deserializer 58 are connected as an input to frame address compare logic 74. These 16 bits represent the RCV_DATA signal. Frame address compare logic 74 has an output coupled to address compare state machine 76 which, in turn, has a feedback output signal connected back to frame address compare logic 74. The RCV_DATA signal input to frame address compare logic 74 is output to an address compare registers 78. In addition, an input of address compare state machine 76 is connected to an output from address compare registers 78. Address compare registers 78 outputs the 16 bit RCV_DATA signal to an internal data bus 80.

The output of receive FIFO buffers 64 and 66 connects the 18 bit data signal to data bus 80. In addition, data bus 80 is bi-directionally coupled to a series of receive DMA registers 82. Specifically, receive DMA registers 82 include first and second length registers 84 and 86, first and second address registers 88 and 90, and a receive temporary pointer (37 RTP") and a receive chain pointer ("RCP") register 92 and 94, respectively. Length registers 84 and 86 and address registers 88 and 90 are all connected to a special receive bus 96. Receive bus 96 receives input signals from RTP register 92 and RCP register 94 as well as from a CONST block 98. The outputs of address registers 88 and 90 as well as the outputs of RTP register 92 and RCP register 94 are connected to an internal address bus 100. A receive buffer manager 102 is also associated with the receive DMA registers for performing the function of data buffer management.

With reference now to FIG. 4b, the INSERT_DATA signal from FIG. 4a is connected to the input of a fairness delay block 104. A logic block 106 is associated with fairness delay block 104 for bit serial logic operations and priority token stacking operations required by the priority token protocol. The INSERT_DATA signal input to fairness delay block 104 is also split off to form a derivative signal, REPEAT_DATA, which is provided to circuitry discussed in connection with FIG. 4c. The output of fairness delay block 104 is connected to the input of a monitor delay block 108. In addition, this output is split off to form a FAIR_DATA signal, which is connected to circuitry discussed below in connection with FIG. 4c. The output of monitor delay block 108 is connected to an elastic buffer 110. Elastic buffer 110 receives as a second input the FERCLK signal and is controlled by a clock input denoted PXTALIN. Elastic buffer 110 generates an output signal, DDB_ATA, which is connected to circuitry discussed below in connection with FIG. 4c.

FIG. 4b further illustrates numerous functional blocks which are not shown having physical connections to one another, but are described in detail below in a functional sense and should be understood by one skilled in the art as necessarily connected to various blocks in order to effect the functionality described. Thus, FIG. 4b illustrates a serial transmit state machine 112, a transmit token manager/defer state machine 114, and a receive data manager 116. In addition, FIG. 4b illustrates a fairness state machine 118 and a monitor state machine 120. Still further, FIG. 4b illustrates a token ring PT prescaler 122, an ethernet transmit slot timer 124, and a transmit data manager 126. The transmission function is timed by a transmit timing block 128. In addition, token ring PT prescaler 122 has an output signal used to control a token ring PT timer 130. Similarly, ethernet transmit slot timer 124 has an output signal used to control an ethernet retry and backoff block 132. A token ring gap timer 134, an ethernet exponential select 136, and an ethernet random generator 138 are also associated with token ring PT timer 130 and ethernet retry and backoff block 132. These blocks are illustrated as one overall block because in the preferred embodiment, the same hardware may be configured in order to accomplish the various functions of each of these blocks.

The remaining blocks of FIG. 4b comprise a register decode 140 as well as various types of registers. Specifically, these registers include a data holding register ("DHR") register 142, and ring command registers RINGCMDO 144 and RINGCMD1 146. Registers 142, 144 and 146 are illustrated as a common block because in the preferred embodiment, they are constructed of like hardware. Each of these registers 142, 144 and 146 are connected to data bus 80 to receive data therefrom. Additional registers illustrated in FIG. 4b include a ring status register 148, a transmit status register 150, a receive status register 152 and a temporary PCFE storage register 154. Registers 148, 150, 152 and 154 are shown as a unitary block because they are preferably constructed as a unitary structure, and are connected to output information to data bus 80.

With reference to FIG. 4c, the REPEAT_DATA signal and the FAIR_DATA signal are connected to two of the three inputs of an output multiplexer 156. The third input of output multiplexer 156 is connected to the output of a monitor delay block 158 which delays the DDB_DATA signal which is connected to its input. The output of output multiplexer 156 is connected to the input of a transitional-to-Manchester ("T/M") converter 160. The output of T/M converter 160 provides the FEDRVR signal discussed below.

A three input output multiplexer 162 is provided having an output which provides the TX_DATA signal. The first input of multiplexer 162 is connected to a violation generator 164. The second input of multiplexer 162 is connected to a serializer 166 which is supported by load logic 168. The third input of multiplexer 162 is connected to the output of a CRC generator 170. The input of CRC generator 170 is connected to the output of multiplexer 162. It should also be noted that the output signal, TX_DATA, of multiplexer 162 is connected to the input of a transmit control block 172. Transmit control block 172 provides two output signals, namely, TXD and TXEN, those signals described in greater detail below.

Serializer 166 and load logic 168 receive two 8 bit input signals from a series of hardwired constant values or registers which are utilized to form information for transmission. In particular, a preamble constant value 174, a start delimiter constant value 176 and an end delimiter constant value 178 are connected to one 8 bit input of load logic 168. Similarly, a jam constant value 180, a PCFE register 182 and a FTOK register 184 are connected to the second 8 bit input of load logic 168. Registers 182 and 184 are bidirectionally connected to data bus 80. A transmit parity check block 186 has its outputs connected to the two 8 bit inputs of load logic block 168. The input of transmit parity check block 186 is connected to a series of transmit FIFOS, 188, 190 and 192. Transmit FIFOs 188, 191 and 192 are controlled by a FIFO control block 194. An external address interface 185 is associated with address compare logic 74 for performing the function of allowing external matching of frame addresses.

The input of transmit FIFOs 188, 190 and 192 is connected to data bus 80 as well as to a series of transmit DMA registers 196. In particular, transmit DMA registers includes a first and second length register 198 and 200, a first a second address register 202 and 204, a temporary transmit pointer ("TTP") and series of transmit chain pointer ("TCP") registers 206 and 208, respectively. Specifically, the TCP registers 208 includes eight registers denoted TCP0 through TCP7 for providing pointing features to indicate particular addresses to address bus 100. Transmit DMA registers 196 are bidirectionally coupled to data bus 80. In addition, a special transmit bus 210 has outputs connected to registers 198, 200, 202 and 204 and inputs connected to registers 206 and block 208. A CONST block has its outputs connected to transmit bus 210. The outputs of address registers 202 and 204 as well as TTP register 206 and TCP register block 208 are connected to address bus 100.

FIG. 4c also includes a transmit buffer manager 214 associated with the transmit DNA registers for performing the function of transmit data buffer management. Still further, an interrupt control logic block 218 is illustrated for representing the interrupt functions described below. Finally, two status registers including an interrupt status register 220 and a transmit/receive status register 222 are bidirectionally connected to data bus 80.

Having now described the general interconnections and preferred block representations of the present embodiment, the following represents a detailed description of the functionality of protocol handler 38. Before preceding, however, it should be understood that the blocks of FIGS. 4a-4c are set forth and described mostly in terms of their functionality, with some references, where necessary, to device structure. Accordingly, a person skilled in the art could define various types of structures, circuitries and/or interconnections in order to effect these functional blocks without departing from the scope of the intended embodiments. Thus, returning to FIG. 4a, protocol handler 38 implements each of the functions previously provided for in the TMS 380 token ring chip described above. Accordingly, many of these functions will not be described in detail. Instead, the discussion in this detailed description will primarily include those features included within the present embodiment which permit both token ring and "ETHERNET" operations to be accomplished. Various of these types of features are set forth immediately below.

Receive/transmit clock generator block 50 uses the FERCLK signal to generate the clocks for all of the serial path-shift registers and state machines. The exception to this is when the PXTALIN signal is used to clock outgoing data when the crystal transmit (CXMT) bit is set in ring command one register 146. In ethernet mode, TXC is used to clock all the transmit logic and RXC all the receive logic. The token ring serial path blocks are clocked with RXC (they are not used but need to be clocked if implemented as dynamic logic).

Manchester-to-transitional decoder 52 converts the differential Manchester code transmitted on the ring into an internal format called "transitional" code, so named because baud are encoded based on their transition from the previous baud. In Manchester encoding, data bits are transmitted as two successive baud of opposite polarities. Information content and bit synchronization are derived from the presence or absence of a transition in the physical signalling level. Data is transmitted on the ring in conformance with IEEE 802 standard differential Manchester encoding. Front end circuit 26 synchronizes an analog phase locked loop on the incoming data stream, and extracts a baud frequency clock from the data. The baud data is made available to protocol handle 38 via the FERCVR pin signal. The baud clock is provided to protocol handler 38 via the FERCLK (Receive Clock) pin signal. The FERCLK signal is synchronized so that incoming data on FERCVR changes on the falling edge of FERCLK, so that data is valid at the rising edge of FERCLK.

Transitional code is defined in Table 1, below.

TABLE 1

| TRANSITIONAL ENCODING | | |
|---|---|---|
| Previous Baud Polarity | Current Baud Polarity | Current Transitional Code |
| + | + | 1 |
| − | − | 1 |
| + | − | 0 |
| − | + | 0 |

Protocol handle 38 generates transitional code by calculating the exclusive NOR of the current baud with the last received baud value.

A data bit of zero is selected by a transition on the first baud of the bit and a data bit of one is selected by no transition on the first baud. In the manchester encoding scheme, valid data bits always have a transition between the first baud and the second. A code violation is indicated if no such transition occurs. The possible options are indicated in Table 2, below.

TABLE 2
MANCHESTER ENCODING

| Transitional Code | | | |
|---|---|---|---|
| First Baud | Second Baud | Symbol | Description |
| 0 | 0 | 0 | Valid zero data bit |
| 0 | 1 | V0 | Zero data bit with violation |
| 1 | 0 | 1 | Valid one data bit |
| 1 | 1 | V1 | One data bit with violation |

In ethernet mode, Manchester-to-transitional decoder 52 is only responsible for sampling incoming data. Thus, in "ETHERNET" mode, decoder 52 does not perform any code conversion. Such conversion is unnecessary because RXD is already recognizable data (code conversion is carried out by the ethernet front end circuit).

Delimiter decoder 54 detects the start delimiter (SDEL) and end delimiter (EDEL) sequences defined for the protocol. It also outputs a "BURST4" detect signal for use by other portions of the logic in protocol handler 38. A BURST4 is a sequence of three consecutive ones in transitional code, corresponding to a burst of four consecutive baud with no transitions.

Baud sample latches 56 in token ring mode outputs two signals: ID (sampled data) and ICV (sampled code violation), which are the transitionally encoded values of the first and second baud, respectively for each bit. In "ETHERNET" mode, ID provides the sampled data value of each bit and ICV is always zero.

Deserializer block 58 is preferably a 16-bit serial-in parallel-out shift register. The input to the deserializer is the ID (sampled data) output of the baud sample latches 56. A serial parity generator unit calculates the parity for each eight bits shifted in, and stores this parity with the parallel data. The 18-bits of data and parity are then loaded in parallel into the receive FIFO buffers 64 and 66.

Cyclic redundancy code checker 60 contains a 32-bit feedback shift register (not shown) used for calculation of the CRC field in frames for both receiving and transmitting the frames. Every frame copied by adapter 24 contains a 32-bit check sequence for either the frame header information or the frame data.

Bits 26-31 of CRC checker 60 are saved into a latch after the last bit of the destination address has been operated on. The value of these 6 latched bits are a function of the whole destination address, hashed by the CRC algorithm. The value is used as an index into a 64 bit "hash match" table, to determine whether to match a group addressed frame.

Receive FIFO buffers 64 and 66 (illustrated as RX FIFO(0) and RX FIFO(1)) store parallel data. Specifically, the buffers store up to two words of deserialized data before it is transmitted via DMA into adapter memory 44. Data is transferred onto data bus 80 under control of FIFO controller 67. In particular, data enters RXFIFO(0) from deserializer 58, and is then shifted into RXFIFO(1), and then onto data bus 80 as DMA data to adapter memory 44. In the preferred embodiment, the parallel receive FIFO has two data load inputs, one for most significant bit first data, the other for least significant first data. This supports the different bit-ordering conventions in the network protocols of either ethernet or token ring protocols.

Data insertion multiplexer 68 is used for token ring operations only. Multiplexer 68 selects either repeated data, a constant (binary) zero, or data to be transmitted by adapter 24. Its select inputs are provided by serial receive state machine 70, serial transmit state machine 112, monitor state machine 120, or the transmit idle control state machine.

Serial receive state machine 70 in the preferred embodiment operates for both token ring and "ETHERNET" operations. For both token ring and ethernet operations, it is a finite state machine which controls operation of the receiver portion of the serial path.

Ethernet front end circuits normally only provide a receive clock (RXC) when a carrier is being received. Accordingly, adapter chip 24 receive logic must dynamically switch clocks between RXC and TXC depending on the CRS signal. This creates an inherent clock switching delay from the first RXC cycle with CRS active, to the first RXC clock on which incoming data is sampled. This delay is 2 or 3 clock cycles depending on the previous end of frame clocking (this is explained below). From this first sample bit one of the following two data patterns must be received for a frame to be received. Either:

0.n(10).11 or 10.n(10).11 (n>=3, and integer)

Less formally, this translates to at least a single 0 bit of preamble followed by a start frame delimiter. Should any other data pattern be received frame synchronization is deferred until carrier sense has been deasserted.

At the end of an ethernet frame, carrier sense is deasserted. Adapter chip 24 will correctly sense the end of frame and detect byte alignment, with or without RXC clock cycles following CRS deassertion. This does however affect the startup of the next frame, as a consequence of the method of clock switching used on adapter chip 24. If no RXC clock cycles follow CRS deassertion then the clock switching delay on the next frame will be 2 clock cycles, otherwise it will be 3 cycles.

Given a valid frame synchronization, protocol handler 38 will begin transferring frame data to memory (provided a frame buffer is available), while internal and external address checkers evaluate whether the frame should be copied. In order to present consistent address format to an external address checker for either network (token ring or "ETHERNET"), the ethernet address fields are stored in memory most significant bit first. This is consistent with the most significant bit first format of the various address compare registers. The remainder of the frame (Data and CRC) are stored in least significant bit first format.

In order to allow rejection of frame fragments, adapter chip 24 will normally delay the decision to proceed with copying an address matched frame, until after the minimum frame length has been received. Only if a frame is address matched, and at least 64 bytes long, will it be copied. Any other frames will be buffer recovered. A receive option is available to disable this function and receive smaller address matched frames. This function would normally be used with the "copy all frames" copy option to provide sniffer functions.

Receive slot timer 72 is preferably a pseudo-random counter used to determine slot-time for receive signal (for register 180). Receive state machine 70 uses timer 72 to control receive buffer recovery.

Frame address compare logic 74 compares the currently received 16-bit word of data with the required 16-bit address compare registers 78. Either bit-wise or equality comparisons are performed, with up to 15 bits ignored in the comparisons. Compare logic 74 is controlled by address compare state machine 76.

Address compare state machine 76 is preferably a finite state machine that controls recognition of both source and frame destination addresses. Both ethernet addresses and token ring addresses are checked by state machine 76. As each 16-bit word of the address is received, state machine 76 presents it and the required address control registers to address compare logic block 74, which then performs the combinational logic comparison and ignore functions. It sets an Address_Match output flag to receive buffer manager 102 to indicate that a frame should continue to be copied. In the token ring mode, it produces a Valid_Strip_Address flag to serial transmit state machine 112 to indicate that the correct frame was stripped.

As stated above, address compare state machine 76 also compares a hash function of a frame destination address with a hash table. The CRC checker is used to generate the hash function. The least significant six bits from the CRC feedback shift register are latched after destination address has been operated on. These bits are then demultiplexed into 64 bits and compared against 64 user setable hash match bits (in the four hash match registers).

Address compare registers 78 are preferably 16-bit registers which store the data loaded by software for communications processor 32 and are used for frame address comparison. Thus, address compare registers 78 includes four registers which hold a 64 bit hash match table. Bits are set in this table to enable frames with a corresponding address hash to be copied. Hash matching is only allowed for group addressed frames.

Receive DMA registers 82 are the registers initialized by receive buffer manager 102. They are loaded from data bus 80. These registers also connect to a special receive bus 96, which is used to transfer data from one receive register to another. In the preferred operation of receive DNA registers 82, only receive chain pointer (RCP) register 94 may be accessed during functional operation. All other registers may be accessed only during manufacturing tests. Each of receive DMA registers 82 are described in greater detail immediately below.

RCP register 94 contains the address of the buffer currently being filled with data from the network. Software for communications processor 32 loads register 94 with the head of a linked list of available buffers. Register 94 is cleared at reset.

Receive temporary pointer (RTP) register 92 contains the starting address of a buffer into which the receive DMA channel will store data when the present buffer is full.

Receive channel address registers (ADDR1 and ADDR2) 88 and 90 correspond to two DMA channels for receive operations; one set up to place data in the current receive buffer, and a second set up for the next buffer address, to take over immediately the current buffer is full. Each receive DMA channel has a dedicated address register. These are identified as ADDR0 88 and ADDR1 90, registers, respectively. The address register for each receive DMA channel contains the bus address of the word to be accessed by that channel. Registers ADDR0 and ADDR1 are under the control of receive data manager 116 and receive buffer manager 102.

Receive channel length registers 84 and 86 (LEN0 and LENT1 for the two receive DKA channels contain the number of empty bytes left in the buffer currently being filled by that channel. Registers LEN0 and LENT are completely controlled by receive buffer manager 102 and receive data manager 116.

Receive buffer manager 102 controls the buffer chaining operations on the receive chain. It is preferably a finite state machine that requests bus cycles to set up the DMA channel control registers. Receive and transmit buffer chaining is described in more detail below.

Transmit state machine 112 is a finite state machine that controls operation of the serial transmit path. Transmit state machine 112 is responsible for creating the frame format used by whichever network protocol (i.e., token ring or "ETHERNET" is in use. In token ring mode, it normally uses a token on the ring to form the start of a frame, onto which it appends physical control, address and data fields, ending the frame with checksum, end delimiter and physical control field extension fields. In certain circumstances, state machine 112 must create the whole of the frame. In such cases, it will use the start delimiter constant 176 loaded into serializer 166 to form the data pattern of the delimiter and the violation generator 164 to form its code violation pattern. In "ETHERENET" mode, transmit state machine 112 sends a preamble and start frame delimiter before address and data fields from a data buffer. Transmit state machine 112 creates a start frame delimiter pattern by forcing a one data bit over the last bit of the preamble (i.e., >AAAA plus one bit yields >AAAB). Address and data fields are treated differently: address field bytes are sent most significant bit first; data field bytes least significant bit first. Specifically, serializer 166 supports two different types of data formats for loads from transmit FIFOs 188, 190 and 192. These types include the most significant bit, and least significant bit first/byte which occurs from the conflicting requirement of IEEE 802.3 (ethernet) and 802.5 (token ring). Adapter chip 24 always maintains addresses in most significant format, for both networks. Frame checksum may be generated automatically, or be sent from a buffer. If the latter, bytes must be in least significant bit first format (like the data field—same format as receiver stores it).

In ethernet mode, transmit state machine 112 sends frames as quickly as it can under the constraints of the deference algorithm, but always on specific byte boundaries. Internally, a byte counter is maintained for data alignment. Transmission is always initiated at the same point on this counter. The alignment of this counter is only changed on collisions, where the counter is used to ensure the correct jam length. The first alignment on which all other conditions for transmission are met is used to initiate frame transmission. The effect of this is that frames from the adapter are always sent with an integral number of bytes between them.

In token ring mode every octet (8-bit sequence) is transmitted on the ring in order of increasing byte address in the adapter. Each octet is transmitted most significant bit first.

Further, note that bits in a word are transmitted from bit 0 first, i.e. the most significant bit of the most significant byte. Transmission continues in bit order (bit 1, bit 2, etc.) until bit 7, at which time transmission continues into the least significant byte with bit 8. Transmission continues in bit order (bit 9, bit 10, etc.) until bit 15, at which time transmission of data from the next half-word of memory is started.

Transmitted data will be illustrated as if it were transmitted left to right, i.e. the left most bit is transmitted first. All bits of transmitted data will be numbered from 0 to 7 as they would be numbered in a byte in memory. Notice that for transmitted bytes, bits will be numbered from 0 to 7.

In ethernet mode, octets are sent in order of increasing byte address, like token ring. In contrast, however, bits within a byte are only sent most significant bit first during the address, as opposed to data, fields of the frame. The remainder of the frame is sent least significant bit first.

Defer state machine 114 is only used in ethernet mode, where it is responsible for deferring the start of transmission for the inter-frame spacing time of 96 bits whenever a carrier is sensed. Adapter chip 24 continuously monitors the medium for traffic even if it has nothing to transmit. Whenever the medium is busy, it will defer to the passing frame by delaying any pending transmission of its own. After the last bit of the frame has passed (carrier sense changed from true to false), adapter chip 24 will continue to defer for the inter-frame spacing. If at the end of the inter-frame spacing, a frame is waiting to be transmitted, transmission is initiated independent of the value of carrier sense. When transmission has completed (or immediately if it has nothing to transmit) it will resume monitoring carrier sense.

Defer state machine 114 is IEEE 802.3 compatible and ensures that frames on the network have a minimum spacing of 96 bits, by controlling when a station is allowed to transmit. Defer state machine 114 works independently of the transmitter continuously monitoring both network (via CRS), and transmitter activity. To correctly handle frame collisions and the resulting frame fragments, the 96 bit delay may be broken into two consecutive timing periods IFG1 and IFG2 where IFG1 is retriggerable on carrier sense. It is quite possible for carrier to become "nulled-out" during collisions. Making IFG1 retriggerable prevents any such nulls being confused with the true end of activity on the network. A single timer of 48 bits is used to implement IFG1 and IFG2.

Defer state machine 114 is also used to detect transceiver heart-beat. After the end of every normal transmission the transceiver provides a short burst on the collisions sense signal, to verify its signal path. Protocol handler 38 monitors for this "heart-beat" during the first half of the interframe gap (from the end of TEXN to the end of IFG1). If a heart-beat is not detected, a heart-beat error interrupt is posted. This interrupt may optionally be disabled for transceivers that do not provide Heart-beat.

Receive data manager 116 is preferably a finite state machine which requests and acknowledges bus cycles for DMA cycles to write the received data into memory. It is also responsible for the actual transferring of the received data into memory.

Ethernet transmit slot timer 124 is Preferably a pseudo-random counter used to time the "ETHERNET" slot time of 512 bits for the transmit state machine. The slot time is used to determine the transmit buffer recovery window and to determine the backoff time used in the binary exponential backoff algorithm. Although frame size limits should be enforced by software, transmit slot timer 124 is partly used to detect size limit violations. Should an attempt be made to send a frame shorter than a slot time, it will be detected, the channel halted, and a "short frame" status posted. Long frames can be detected by carrier sense failure detection.

Transceivers with watch-dog timers to prevent long frame transmission, deassert carrier sense in addition to prevent network transmission. Protocol handler 38 monitors CRS from the end of slot-time. If CRS is sampled low, transmission is aborted, the channel is halted, and a "CRS failure" status is posted.

Transmit data manager 126 is preferably a finite state machine which requests and acknowledges bus cycles for DMA cycles to read data to be transmitted from memory. It is also responsible for transferring the data to be transmitted from memory 44 to the serial interface of protocol handler 38.

Ethernet exponential select 126 is preferably an N of 10 bit selector used to generate the backoff value required by the binary exponential backoff algorithm. This algorithm requires a random number R in the range of $0 = <R<2**n$. This provides an exponential ranging function by selecting n least significant bits of the value produced by random number generator 138.

Protocol handler 38 implements the binary-exponential-random-backoff algorithm (blocks 128, 132, 136 and 138) used for ethernet collision backoff in hardware coupled directly to transmit state machine 112. If a collision is sensed, transmit state machine 112 immediately begins transmission of a JAM pattern of 32 1 bits, except during the transmission of the preamble/SFS where it is delayed until after the SFS. The number of collisions experienced by a frame is indicated directly in the frame status field of the transmit buffer. Should a frame experience 15 collisions, or if retries are disabled, the transmit channel will be halted and the frame aborted with a "too many retries" status. Collisions after a slot time are illegal, and although jamming will occur as normal, no retries will be attempted. The transmit channel will be halted, and the frame will be aborted with a "late collision" status.

Protocol handler 38 supports autonomous "ETHERNET" operation with minimal CPU intervention. The collision backoff and deference algorithms are implemented in hardware, and abnormal conditions such as too many retries or late collisions cause channel shutdown.

"ETHERNET" retry and backoff counter 132 is part of the protocol handler 38 buffer-recovery system which allows automatic retries on frames with collisions. Buffer chaining operations on the first buffer of a frame are deferred until after a transmit slot-time. Until this slot-time, time collisions are possible and, therefore, the frame may need to be restarted. After this point collisions should not occur, and it is, therefore, permissible in order to allow buffer chaining. Because of transmit FIFO latency, the minimum buffer size of a multi-buffer transmit frame should be no less than 70 bytes.

Ethernet retry and backoff counter 132 is preferably a 4 bit decrementer used to count down the number of transmit retries for a frame. Its value is used to control the retry backoff delay, and also forms part of the transmit status. Ethernet backoff counter 134 is used to decrement the backoff value generated by the exponential selector 136. Backoff time is complete when the counter value reaches zero or if the start value is zero. If its contents are non-zero, it is decremented once per slot-time (as indicated by slot timer 124).

Ethernet random number generator 138 is preferably a 10 bit pseudo-random counter used to generate the random number used in the binary exponential backoff algorithm. This counter is free-running from reset.

Data holding register 142 is preferably a latch to synchronize the data written to the RINGCMD0 or RINGCMD1 registers 144 and 146. The latter registers are synchronized to the serial state machine clocks, and hence a temporary register is required to hold the data written from data bus 80, which is synchronized with the LBCLK inputs.

RINGCMD0 register 144 enables specific receive and transmit modes of protocol handler 38. It also contains bits to select which protocol handler register is accessed during chip testing. Each bit in RINGCMD0 register 144 is modified only by communications processor 32. It should also be noted that the bits of RINGCMD0 register 144 have different meanings depending on whether adapter chip 24 is in token ring or ethernet mode.

RINGCMD1 register 146 is the master control register of protocol handler 38. It controls such functions as protocol handler reset and address recognition. Each bit in RINGCMD1 register 146 is modified only by communications processor 32.

Receive status register 148 contains status information associated with receive operations. This is the same status information which is written to the header of the last DMA buffer of a received frame.

Transmit status register 150 contains status information associated with transmit operations. This is the status information which is written to the header of the last DMA buffer of a transmitted frame. In normal operations, transmit status register 150 is accessed only by protocol handler 38.

RINGSTS register 152 provides general network status information, including front end circuit status, error logging, and token validation. Bits in RINGSTS register 152 may be modified by either communications processor 32, protocol handler 38, or both, depending on the individual bit definitions.

Output multiplexer 162 is under control of transmit state machine 112, and selects either CRC generator 170 or serializer 166 output onto the transmit data path (i.e., TX-DATA).

Transmit serializer 166 is preferably a 16-bit parallel-in serial-out shift register. All 16-bits may be loaded from the top transmit buffer TXFIFO(O) 188, the concatenation of SDEL from register 176 and FTOKREG from register 184, the concatenation of EDEL from register 178 and PCFEREG from register 182, an >AAAA (hex) pattern from preamble register 174, or with a jam signal from register 180. PCFEREG register 182 is loaded from the least significant byte of the TXSTAT word of the last buffer transmitted in a frame. FTOKREG register 184 is loaded either from communications processor 32 software via data bus 80 or by serial transmit state machine 112. SDEL and EDEL registers 176 and 178 are hardwared realizations of the token ring SDEL and EDEL data bit patterns. Code violation sequences for SDEL and EDEL are generated by the transmit code violation generator 164.

CRC generator 170 generates the FCS/HCS (Frame/Header Check Sequence) to be inserted by protocol handler 38 when transmitting. The description of the CRC checker 60 above describes an equivalent implementation of a CRC generator. For transmission of data in the preferred embodiment, CRC checker 170 receives a one bit control signal to control the flow on input bits. Thus, when the control bit is set to one, input bits are shifted in and also directly shifted out to the ring. When the control bit is set to zero, the feedback paths are disabled and a shift register within checker 60 shifts the inverse of the register contents in the output. Before shift-in begins, initialization logic (not shown) presents all register positions to 1. For receipt of data, after the transmitted FCS has been shifted in, the value of the shift register within checker 60 should be:

| 1101 | 1110 | 1011 | 1011 | 0010 | 0000 | 1110 | 0011 |
|------|------|------|------|------|------|------|------|
| >D   | >E   | >B   | >B   | >2   | >0   | >E   | >3   | where the left most bit corresponds to bit X0 and the rightmost bit corresponds to bit X31. As discussed in greater detail below, separate CRC circuits are used for the receive and transmit channels. In the preferred embodiment, protocol handler 38 has separate CRC checker and generator circuits, with appropriate bit gating logic.

TXCTL block 172 takes serialized data from transmit multiplexer 162 and drives the ethernet front end signals as appropriate under control of transmit state machine 112. TXCTL block 172 also allows transmit state machine 112 to force data ones, which allows the JAM and start frame delimiter patterns to be created.

In token ring mode, fire token register 184 is used to hold the FCF0 to be included in a token that will be generated by adapter chip 24 and transmitted on the ring. This register is used as a working register by protocol handler 38. It can also be written by communications processor 32 if protocol handler 38 is in an inactive state when PTOKREG register 184 is written by communications processor. 32. If protocol handler 38 is in an inactive state when the FTOKREG register 184 is written by communications processor 32, protocol handler 38 will immediately transmit (i.e., "fire") a free token on the ring, including a starting delimiter, the data in FTOKREF register 184 as the PCF0 type, and an ending delimiter. This allows communications processor 32 to transmit an arbitrary token on the ring.

FTOKREG register 184 is used in ethernet backoff self-test mode to create a simulated transmit collision, or for diagnostic purposes. A collision is created whenever the register is written to irrespective of the data.

External address interface 185 provides a means by which adapter chip 24 can interact with external hardware to extend its network address recognition capabilities. In the preferred embodiment, this external hardware is referred to as an external address checker. The external address checker can operate in parallel with the normal address checker in protocol handler 38 to determine which frames should be copied. The external address checker can be used to provide recognition of extra addresses, perform bridge routing or line monitoring functions.

Transmit parity checker 186 checks the parity of data transferred from TXFIFO(O) 188 to transmit serializer 166. It performs the final check of data before it is placed in serializer 166. After this final check, the data validity is protected by the frame check sequence code which is generated by CRC generator 170.

The transmit buffer FIFOs 188, 190 and 192 provide for three 16-bit words to allow protocol handler 38 to maintain a constant flow of transmitted data into transmit serializer 166. The parity read from the bus is maintained in the FIFO. In operation of data transfer, the first word of a transmit frame is transferred via DMA to TXFIFO(O), the second to TXFIFO(l), the third to TXFIFO(2), the fourth to TXFIFO(O) and so on. Data is taken from each TXFIFO in turn and serialized. Thus, in the preferred embodiment, there is no shifting of data from one TXFIFO to another.

Transmit FIFO control pointer 194 consists of two three state pointers. The first pointer is used to indicate which of the three TXFIFOs 188, 190 or 192 is next to be loaded by transmit data manager 126. The other pointer indicates which TXFIFO is currently being muxed to the serializer and then transmitted.

Transmit DMA registers 196 are the registers loaded by transmit buffer manager 214. Only the transmit chain pointers (TCPS) 208 may be loaded during functional operation. All other transmit DMA registers may be accessed only during manufacturing tests.

Transmit chain pointers 206 (TCP0 to TCP7) are eight prioritized TCP registers of which TCP7 has the highest priority and TCP0 the lowest. A TCP register contains the starting address of a buffer from which the appropriate transmit channel can fetch frame data waiting to be transmitted. These registers can be modified by either protocol handler 38 or communications processor 32. Each TCP register can be loaded by communications processor software with the head of a linked list of buffers to be transmitted. Protocol handler 38 will always try to transmit the frame pointed to by the highest active TCP register. Therefore, data is sent in order of priority. Transmit buffer manager 214 steps down the list pointed to by the particular TCP register in use, loading it with the new address when it chains to the next buffer.

Transmit temporary pointer (TTP) 206 contains the starting address of the buffer from which the transmit DMA channel will read data when the present buffer is sent. It is completely controlled by transmit buffer manager 214.

Protocol handler 38 maintains two DMA channels for transmit operations; one set up to move data from the current transmit buffer to the ring, and a second set up for the next chained buffer, to take over immediately, when the current buffer is empty. Each transmit DMA channel has a dedicated address register. These are called ADDR0 and ADDR1 registers 202 and 204, respectively. The channel address register for each transmit DMA channel contains the bus address of the word to be accessed by that channel. ADDR0 and ADDR1 registers 202 and 204 are under the control of transmit data manager 126 and transmit buffer manager 214.

The transmit channel length registers, LEN0 198 and LEN1 200, for the two transmit DMA channels, contain the number of bytes yet to transmit from the current buffer. Registers LEN0 and LEN1 are completely controlled by transmit buffer manager 214 and transmit data manager 126.

Transmit buffer manager 214 is preferably a finite state machine that performs the automatic buffer chaining along the frame transmit chain. It initializes the transmit DMA channel registers 196. Operation of transmit buffer manager 214 is provided in a later section.

FIG. 5 illustrates a block diagram of adapter chip 24 of the present embodiment, including the various pin designations for the chip. Certain pins on chip 24 are used in one mode for token ring communication and in an alternative mode for ethernet and, hence, are indicated as having two different signals separated by a "/" indication. In these dual signal indications, the first signal corresponds to token ring operation and the second signal corresponds to ethernet operation. Other pins having dual signal indications are associated with various dual functions, each of which are set forth in the following descriptions. For example, system interface pins with alternate names for Intel and Motorola modes list the Intel mode name first. Still other pins receive or provide a single signal which is described below.

the particular signals on each of the pins are so follows:

| Pin Designation | Signal(s) Description |
|---|---|
| SI/M- | System Intel/Motorola Mode Select. If this input is strapped high, one of the two Intel-compatible microprocessor interface modes is selected; if strapped low, the Motorola-compatible interface mode is selected. This pin has an internal pullup device to maintain a high voltage on it when it is not driven. |
| S8/SHALT- | System 8/16 bit bus select and halt/bus error retry. In Intel mode this input signal selects between an 8 bit or a 16 bit data bus interface. In Motorola mode this signal becomes the SHALT- signal. If this signal is asserted along with bus error (SBERR), adapter chip 24 will retry the last DMA cycle. This is the re-run operation as defined in the Motorola 68000 specification. The BERETRY counter is not decremented by SBERR- when SHALT- is asserted. This pin has an internal pullup device to maintain a high voltage on it when it is not driven. Combinations of SI/M- and S8/16- mode are classified as follows:<br><br>SI/M-   S8/16-   Mode Name<br>0   SHALT-   Motorola 16-bit (68000)<br>1   0   Intel 6-bit (8086)<br>1   1   Intel 8-bit (8088) |
| SRESET- | System Reset. This input is activated to place adapter chip 24 into a known initial state. Hardware reset will Hi-Z most of the output pins of adapter chip 24 and place all blocks into the reset state. |
| SCS- | System Chip Select. The chip select input signal activates the system interface of adapter chip 24 for a DIO read or write. This pin has an internal pullup device to maintain a high voltage on it when it is not driven. |
| SRSX | System Register Select Extended. This input signal gives the most significant bit used for accessing DIO registers. |
| SRS(0-2) | System Register Select. Thse inputs together with SRSX select the word or byte to be referenced during a system DIO access. In Intel 8-bit mode or during a byte access in Intel 16-bit mode, the SRS2 pin selects the byte referenced. In Motorola mode, SRS2 is used for the SBERR- signal as defined below. |
| SRS2/SBERR- | Bus Error. In Intel mode this input signal is the SRS2 signal as defined above. In Motorola mode this input is driven active-low during a DMA cycle to |

-continued

| Pin Designation | Signal(s) Description |
| --- | --- |
| | indicate to adapter chip 24 that the cycle must be terminated abnormally. It corresponds to the Bus Error signal of the 68000 microprocessor. It is internally synchronized to SBCLK. This pin has an internal pullup device to maintain a high voltage on it when it is not driven. |
| SBHE-/SRNW | System Byte High Enable or Read/Not Write. In Intel mode (SI/M- = 1), this input/output pin serves as an active-low byte-high-enable signal, SBHE-. SBHE- is a three-state output that is driven during DMA and an input at all other times. In Motorola mode (SI/M- = 0), this pin serves as a control system which is high to indicate a read cycle and low to indicate a write cycle. System interface 34 drives this signal as an output during DMA on the system bus; it is an input during DIO cycles. An internal pullup device is included to maintain a high voltage on this pin when it is not driven. |
| SWR-/SLDS- | System Write Strobe or Lower Data Strobe. In Intel mode, this input/output pin serves as the active-low write strobe. In Motorola mode, this input/output pin serves as the active-low lower data strobe. This pin is an input during DIO, and an output during DMA. An internal pullup device is included to maintain a high voltage when the pin is not driven. |
| SRD-/SUDS- | System Read Strobe or Upper Data Strobe indicator. In Intel mode, this input/output pin is an active-low strobe indicating that a read cycle is performed on the system bus. In Motorola mode, this input/output pin is an active-low strobe indicating that data is transferred on the most significant byte of the system bus. SRD-/SUDS- is an input during DIO, and an output during DMA. An internal pullup device is included to maintain a high voltage when the pin is not driven. |
| SRAS/SAS- | System Register Address Strobe or Memory Address Strobe. In Intel mode, this input/output pin serves as the system register address strobe, with which SCS-, SRSX, SRS<0-2> and SBHE- are latched. In a minimum-chip system, SRAS is tied to the ALE output of the user processor. This latching capability is easily defeated, as is usually desired in expanded Intel 8086/8088 systems supporting non-multiplexed address and data buses. The internal latch for these inputs remains transparent as long as SRAS remains high, permitting this pin to be strapped high and the signals at the SCS-, SBHE-, SRSX and SRS<0-2> inputs to be applied independent of an ALE strobe from the user processor. During an Intel DMA this signal remains an input. In Motorola mode, this pin is an active-low address strobe, which is an input during DIO (although ignored as an address strobe), and an output during DMA. An internal pullup device is provided to maintain a high voltage when the pin is not driven. |
| SRDY-/SDTACK- | System Bus Ready or Data Transfer Acknowledge. In Intel mode, this input/output pin serves as an active-low bus ready signal. In Motorola mode, this input/output pin serves as the active-low data transfer acknowledge signal. The purpose of the SRDY- and SDTACK-.signals is to indicate to the bus master that a data transfer is complete. SRDY-/SDTACK- is internally synchronized to SBCLK. During DMA cycles, it must be asserted before the falling edge of SBCLK in state T2 in order to prevent a wait state. SRDY-/SDTACK- is an output when adapter chip 24 is operational for DIO, and an input otherwise. An internal pullup device is implemented so that the signal is pulled high when not driven. |
| SALE | System address Latch Enable. At the start of each DMA cycle, this output provides the enable pulse used to externally latch the sixteen least significant bits ("LSBs") of the address from the multiplexed address/data lines. Systems which implement parity on addresses can use SALE to externally latch the parity bits (on SPH and SPL) for the sixteen LSBs of the DMA address. |
| SXAL | System Extended Address Latch. This output provides the enable pulse used to externally latch the 16 address extension bits of the 32-bit system address during DMA. SXAL is activated prior to the first cycle of each block DMA transfer, and thereafter as necessary (whenever an increment of the DMA address counter causes a carry-out of the lower 16 bits). Systems which implement parity on addresses can use SXAL to externally latch the parity bits (available on SPL and SPH) for the DMA address extension word. |
| SDDIR | System Data Direction. This output provides a signal to the external data buffers indicating the direction in which the data is moving. During DIO writes and DMA reads, SDDIR is low (input mode); during DIO reads and DMA writes, SDDIR is high (output mode). These functions are illustrated by Table 1, immediately below. |

TABLE 1

| SDDIR | DIRECTION | DIO | DMA |
| --- | --- | --- | --- |
| 0 | input | write | read |
| 1 | output | read | write |

| | When the system interface is not involved in a DIO or DMA operation, SDDIR is high by default. |
| --- | --- |
| SDBEN- | System Data Bus enable. This output provides to the data buffers external from adapter chip 24 the active-low enable signal that causes them to leave the high-impedance state and begin transmitting data. This output is activated during both DIO and DMA. |
| SOWN- | System Bus Owned. This output goes active-low during DMA cycles to indicate to external devices that adapter chip 24 has control of host bus 16. SOWN- drives the enable signal of the bus transceivers chips which drive the address and bus control signals. |
| SBCLK | System Bus Clock. This is the external input clock signal with which adapter chip 24 synchronizes its bus timing for both DIO and SDMA transfers. For asynchronous buses, any TTL oscillator signal may be applied. |

-continued

| Pin Designation | Signal(s) Description |
| --- | --- |
| SHRQ/SBRQ- | System Hold Request or Bus Request. This output is used to request control of host bus 16 in preparation for a DMA transfer. In Intel mode, it is an active-high hold request, as defined in the standard 8086/8088 interface. In Motorola mode, it is an active-low bus request, as defined in the standard 68000 interface. |
| SHLDA/SBGR- | System Hold Acknowledge or Bus Grant. In Intel mode, this active-high input signal indicates that the DMA hold request has been acknowledged, in accordance with the standard 8086/8088 interface. In Motorola mode, this signal is an active-low bus grant, as defined in the standard 68000 interface. In either mode, it is internally synchronized to SBCLK. |
| SBBSY-/SCAN1 | System Bus Busy. This input signal samples the value of the Motorola 68000-style Bus Grant Acknowledge (BGACK-) signal. Adapter chip 24 must sample SBBSY- high before it drives the system bus. Its operation is defined for both Intel and Motorola mode, but Intel systems usually have no equivalent signal. As a convenience to Intel mode users, an internal device pulls this pin high if it is left unconnected. This pin is used as the scan 1 input in the serial test modes. |
| SBRLS- | System Bus Release. This input is driven active-low during DMA to indicate that a higher priority device requires the system bus and that adapter chip 24 should release the bus as soon as possible. When adapter chip 24 is not performing DMA, this input is ignored. In operation, the signal is defined for both Intel and Motorola modes, but Intel systems usually have no equivalent signal. It is internally synchronized to SBCLK. This pin has an internal pullup device to maintain a high voltage on it when it is not driven. |
| SINTR/SIRQ- | System Interrupt Request. Adapter chip 24 activates this output to signal an interrupt request to the user processor. In Intel mode, this pin is active-high; it is active-low in Motorola mode. |
| SIACK- | System Interrupt Acknowledge. This input is driven active-low by the host processor to acknowledge the interrupt request from adapter chip 24. Adapter chip 24 responds to this signal by gating its interrupt vector onto internal system bus 42. System buses not requiring an interrupt cycle may strap SIACK-high. This pin has an internal pullup device to maintain a high voltage on it when it is not driven. |
| SADH(0-7) | System Address/Data Bus -- high byte. This input/output is the most significant byte of the 16-bit address/data bus. In both Intel and Motorola mode, this signal multiplexes out bits 31 to 24 and 15 to 8 of the address bus and bits 15 to 8 of the data bus (using Intel/Motorola standard bit numbering conventions). At system interface 34, the most significant bit is SADH(0) and the least significant bit is SADH(7). These pins have internal pullup devices to maintain high voltages on them when they are not being driven. |
| SADL(0-7) | System Address/Data Bus -- low byte. This input/output is the least significant byte of the 16-bit address/data bus. In both Intel and Motorola mode, this signal multiplexes out bits 23 to 16 and 7 to 0 of the address bus and bits 7 to 0 of the data bus (using Intel/Motorola standard bit numbering conventions). At system interface 34, the most significant bit is SADL(0) and the least significant bit is SADL(7). These pins have internal pullup devices to maintain high voltages on them when they are not being driven. |
| SPH | System Parity High. Contains an odd-parity bit for each data or address byte transmitted over SADH(0-7). This input/output pin has an internal pullup device to maintain a high voltage on it when it is not driven. |
| SPL | System Parity Low. Contains an odd-parity bit for each data or address byte transmitted over SADL(0-7). This input/output pin has an internal pullup device to maintain a high voltage on it when it is not driven. |
| MBCLK1 | Adapter Bus Clock 1. |
| MBCLK2 | Adapter Bus Clock 2. MBCLK1 and MBCLK2 are the output clock references for all adapter bus transfers. MBCLK2 lags MBCLK1 by 90°. These clocks operate at twice the memory cycle rate. |
| MADH(0-7) | Adapter Memory Address, Data and Status input/output signals. For the first quarter of a memory cycle, these signals carry address bits AX4 and A0 through A6; for the second quarter, these signals carry status bits; and for the third and fourth quarters, they carry data bits 0 to 7. |
| MADL(0-7) | Adapter Memory Address and Data input/output signals. For the first quarter of a memory cycle, these signals carry address bits A7 to A14; for the second quarter, these signals carry address bits AX4 and A0 through A6; and for the third and fourth quarters, they carry data bits 8 to 15. |
| MAXPH | Adapter Memory Extended Address and Parity input/output signals. For the first quarter of a memory cycle, this signal carries extended address bit (AX1); for the second quarter, this signal carries extended addresss bit (AX0); and for the third and fourth quarters, it carries the parity bit for the MS data byte. |
| MAXPL | Adapter Memory Extended Address and Parity input/output signals. For the first quarter of a memory cycle, this signal carries extended address bit (AX3); for the second quarter, it carries extended address bit (AX2); and for the third and fourth quarters, it carries the parity bit for the least significant data byte. |
| MAX0 | Extended Address input/output Bit. This signal drives AX0 at ROW time and A12 at COL and DATA time for all cycles. Driving A12 eases interfacing to a BIA ROM. |
| MAX2 | Extended Address input/output Bit. This signal drives AX2 at ROW time, A14 at COL time and DATA time for all cycles. Driving A14 eases interfacing to a BIA ROM. |
| MRAS- | Row address strobe for DRAMs. The row address lasts for the first 5/16 of the memory cycle. This output signal is taken low while the row address is valid on MADL(0-7), MAXPH and MAXPL, for both RAM and EPROM cycles, and during refresh cycles when the refresh address is valid on MADL(0-7). When the arbitration logic grants access to an external bus master this pin goes high impedance to allow any external device to control the signal. |

-continued

| Pin Designation | Signal(s) Description |
|---|---|
| MCAS- | Column address strobe for DRAMs. The column address is valid for the 3/16 of the memory cycle following the row address time. This output signal is taken low every cycle while the column address is valid on MADL(0-7), MPH and MAXPL, except when one of the following conditions occurs:<br>(1) When the address is reserved for BIA ROM (>00.000 - >00.000F);<br>(2) When the address is assigned to be EPROM (i.e., when the BOOT bit in the ACTL register of system interface 34 is zero and an access is made to >00.XXXX or >1F.XXXX);<br>(3) When the address is one of the on-chip addresses (>01.0100 - >01.01FF in normal mode and >01.0100 - >01.07FF in cpless mode);<br>(4) The cycle is a refresh cycle in which case MCAS- is driven out at the start of the cycle before MRAS- (this occurs for DRAMs that have CAS before RAS refresh; for DRAMs that do not support CAS before RAS refresh it may be necessary to disable MCAS with MREF); or<br>(5) The cycle is under the control of an external bus master. In this case the output will be tri-stated to allow an external device to control the signal. |
| MREF | DRAM refresh cycle in progress. In master operations, this output signal is high when memory interface 40 is performing a refresh cycle. It is used for disabling MCAS- to all DRAM that do not use a CAS-before-RAS refresh. In slave operations this signal is asserted with a bus request to indicate to the bus controller that the refresh machine is asking for the bus. |
| MW- | Adapter Memory Write. This output signal is low during writes and high during reads. The data on the MADH(0-7) pins and MADL(0-7) buses is valid while MW- is low. DRAMs latch data on the falling edge of MW- while SRAMs latch data on the rising edge of MW-. This pin goes high impedance when adapter chip 24 is not the bus master. |
| MAL- | Memory Address Latch. This output is a strobe signal for sampling the address at the start of the memory cycle. It is used by SRAMs and EPROMs. At the falling edge of MAL-, the full 20 bit word address is valid on MAX0, MAXPH, MAX2, MAXPL, MADH(0-7) and MADL(0-7). Three 8 bit transparent latches can therefore be used to retain a 20 bit static address throughout the cycle. This pin goes high impedance when adapter chip 24 is not bus master. |
| MDDIR | Data Direction. This input/output signal is an output when adapter chip 24 is bus master and an input otherwise. It is used as a direction control for bi-directional bus drivers. It is low for reads and high for writes. It becomes valid before MW-. This pin goes high impedance when adapter chip 24 is not bus master. |
| MBEN- | Buffer Enable. This output signal is used in conjunction with MDDIR, and enables the bi-directional buffer outputs on the MADH and MADL buses during the data phase in the direction selected by MDDIR. This pin goes high impedance when adapter chip 24 is not bus master. |
| MROMEN- | ROM Enable. This output signal is only active at ROW time in the first 5/16 of the memory cycle. It is used to provide a chip select for EPROMs when the BOOT bit of the ACTL register of system interface 34 is zero (i.e., when code is resident in ROM, not RAM). It is latched by MAL-, along with the rest of the address at ROW time. It goes low for any READ from addresses >00.0010 - >00.FFFF or >1F.0000 - >1F.FFFF. It stays high for WRITES to these addresses, accesses of other addresses, or access of any address when the BOOT bit is one. At COLUMN and DATA time, it drives A13 for interfacing to a BIA ROM. This means MBIAEN-, MAX0, ROMEN- and MAX2 together form a glueless interface for the BIA ROM. This pin goes high impedance when adapter chip 24 is not bus master. |
| MBIAEN- | Burnt-In Address Enable. This output signal is used to provide a chip select for ROM containing the Burnt-In Address (BIA) of adapter chip 24. It goes low for any READ from addresses between >00.0000 and >00.000F. It stays high for WRITES to these addresses, or access of any other address. This pin goes high impedance when adapter chip 24 is not bus master. |
| MOE- | Output Enable. This output signal is used to enable the outputs of DRAMs which have a "x1" orientation (e.g., the commercially available TMS4164s from Texas Instruments; 64K × 1) using a 244-type circuit. It is required because their DRAM Q outputs produce anomalous signals during write cycles. On x4 DRAMs (e.g., TMS4464 64K × 4), MOE- connects directly to the DRAM's output enable pin. It goes low during READ cycles under the same conditions that MCAS- goes low. During write cycles, it stays inactive high. This pin goes high impedance when adapter chip 24 is not bus master. |
| MACS- | Adapter Chip Select. This input is used for all internal chip selects. If disasserted, no accesses can take place on-chip. If adapter chip 24 attempts an on-chip access while disasserted, the access is performed off-chip. When asserted, on-chip accesses can take place. When adapter chip 24 performs a successful on-chip access the data is driven out on the address bus for test purposes. |
| MBRQ- | Adapter Memory Bus Request. This input pin is driven low by an external device to request the local bus. If it is acknowledged by MBGR-, the device can take control of the bus. |
| MBGR- | Memory Bus Grant. Output from adapter chip 24 to allow an external device to become a bus master. |
| MRESET- | Memory Bus Reset. Active low output reset signal generated when either ARESET bit in the ACTL register is set or SRESET- is asserted. This signal is used for resetting external glue logic such as the buffer interface for system interface 34. |
| CLKDIV | Clock Divider Select. This pin is reserved. |
| OSCIN | External Oscillator Input. This input line supplies the clock frequency to adapter chip 24. For a 4MHz internal bus, it should be 64MHz. |

-continued

| Pin Designation | Signal(s) Description |
|---|---|
| SYNCIN- | Clock Synchronizer Input. This input pin ensures that in systems with more than one adapter chip 24, the internal clocks are properly synchronized. An active low pulse synchronizes all adapter chips so long as OSCIN is running. The internal clocks restart when SYCIN- goes high. |
| VDDL 2 Pins | Logic power supply. All VDD pins must be attached to the common system power supply. |
| VSSL 3 Pins | Ground connections for logic. All VSS pins must be attached to system ground. |
| VDDO(1-6) | Output Buffer power supplies. All VDD pins must be attached to the common system power supply. |
| VSSO(1-6) | Ground connections for Output Buffers. All VSS pins must be attached to system ground. |
| VDDI 1 Pin | Input Buffer power supplies. All VDD pins must be attached to the common system power supply. |
| VSSI 2 Pins | Ground connections for Input Buffers. All VSS pins must be attached to system ground. |
| VSSC 2 Pins | Clean Ground connections for Input Buffers. All VSS pins must be attached to system ground. |
| FEDRVR | Front End Circuit Transmitter (Driver) Data Positive. This is the positive going output for data to be driven onto a token ring transmit pair. The front end circuit 26 provides current amplification of the data supplied by FEDRVR and FEDRVR- to generate the transmitted signal output. Both positive and negative versions of FEDRVR are supplied in order to be able to minimize asymmetry of the data which is put onto the ring. This allows the front end circuit 26 to always work from rising edges and, therefore, removes the error introduced by the difference in rise and fall times of FERCLK. This pin is not applicable in Ethernet mode. |
| FEDRVR- | Front End Circuit Transmitter (Driver) Data Negative. This is the negative going output for data to be driven onto a token ring transmit pair used in conjunction with FEDRVR. This pin is not applicable in Ethernet mode. |
| FENSRT/-FELPBK/ SCAN 1 | -FENSRT: Token Ring Insert. This output line, when low, forces the front end circuit 26 to activate the appropriate ring insertion mechanism. -FELPBK: Ethernet SNI Loopback. (SNI is Serial Network Interface or Ethernet front end device). This output line, when asserted low, causes the Ethernet SNI to loopback data between transmitter and receiver. Data from adapter chip 24 is passed directly back to it, without transmission onto the network. SCAN1: Scan-out. This output pin is also used as a SCAN1 output in serial test modes. |
| FERCLK/FERXC | FERCLK: Token Ring Received Clock. This is the clock input for the incoming token ring data. It is connected to the output of the VC0 on network front end circuit 26. It is a "TTL-level" signal, with expanded VIH and VIL specifications. FERXC: Ethernet Receive Clock. The receive clock input signal is used to synchronize the controller with data from front end circuit 26. FERXC is provided by front end circuit 26 only while a frame is being received. Adapter chip 24 will automatically switch its internal receiving clocks between RXC and TXC depending on the state of Carrier Sense (CRS). |
| FERCVR/FERXD | FERCVR: Token Ring Front End Received Data. This input signal contains the data received from the token ring, as detected by front end circuit 26. It is a "TTL-level" signal, with expanded VIH and VIL specifications. Data is received from front end circuit 26 on this line, synchronously to FERCLK. FERXD Receive Data input in Ethernet mode. Active high. Data is received from front end circuit 26 on this line, synchronously to RXC. |
| FEREDY-/FECSN | FEREDY-: Token Ring Front End Ready. This input line is asserted low by front end circuit 26 when both of the following conditions are met: (1) minimum signal energy is detected on the input pair; and (2) the front end circuit 26 phase locked loop (PLL) is locked on the input signal. Normally the second condition will be hardwired to appear in the locked condition. FECSN: Carrier Sense in Ethernet mode. This input signal is used to indicate that there is data on the channel. The signal is asserted (high) when the first bit of the data frame preamble is received and is de-asserted after the last bit of the frame is received. |
| FEWFLT-/FECOLL | FEWFLT-: Token Ring Wire Fault Detect. If FENSRT is asserted, this input line is asserted low by front end circuit 26 when it detects a low DC impedance to ground on either or both of the DC transmit lines, or when it detects a high impedance on either or both of the transmit lines. FECOLL: Ethernet Collision Detect. This input signal notifies adapter chip 24 that front end circuit 26 has detected a collision. To be accepted, FECOLL must be active for 2 serial clock cycles. |
| FEWRAP-/FETXEN/ SCAN0 | FEWRAP-: Token Ring Front End Internal Wrap Select. This line, when asserted (low), forces front end circuit 26 to activate an internal attenuated feedback path from the transmitted data (FEDRVR) to received data (FERCVR) signals- In addition, when asserted, front end circuit 26 also cuts off the current drive to the transmission pair. SCAN0: This pin provides the scan 0 output during serial test modes. FETXEN: Transmit Enable in Ethernet mode. This output signal is used to activate the Ethernet front end circuit for transmission. It is asserted (high) on transmission of the first bit of the preamble and it is de-asserted when the last bit of the frame is transmitted. |
| PXTALIN/-FETXC | PXTALIN: Token Ring Monitor Clock. This clock input is used by protocol handler 38 to re-clock data when adapter chip 24 is an active monitor. The clock |

-continued

| Pin Designation | Signal(s) Description |
|---|---|
| | is also used as a reference for auto frequency acquisition. At 4Mb/s (i.e. 8MHz) ring speed, this input can be supplied from the 8MHz output of FEOSC; but at 16Mb/s (i.e. 32MHz) ring speed, this input must be provided by a separate 32MHz crystal oscillator.<br>-FETXC: Ethernet Transmit Clock. A 10MHz input clock used in Ethernet mode to synchronize the transmit data from adapter chip 24 to the ethernet front end circuit. -FETXC is provided by front end circuit 26. The clock runs continuously. |
| FEOSC | Oscillator output to Token Ring Front End Device. This is OSCIN divided by 8. |
| FEFRAQ/FETXD | FEFRAQ: Frequency Acquisition Select. When asserted (high), this output signal selects the PXTALIN signal (connected to the FEXTAL input of front end circuit 26 via FEOSC gated from PXTALIN's source) as the reference frequency for the phase locked loop ("PLL") in front end circuit 26. When deasserted (low), this signal selects the incoming manchester data as the PLL reference. FEFRAQ is taken high to reset the PLL.<br>FETXD: Ethernet Transmit Data. This output signal is the serial data output to the ethernet front end device. Data is synchronous to TXC. |
| EXTINT-(0-3) | External Interrupt Request Inputs. As inputs, these four pins indicate in inverse logic the encoded priority level of an outstanding external interrupt. Bit 0 is the most significant bit. These inputs are latched with the falling edge of MBCLK1. A code of 1111 (i.e., zero) indicates no interrupt pending. The level zero interrupts are supplied directly through reset and the NMI pin. Internal pullups make this the default state if the pins are left unconnected. These pins are outputs in CP-less mode of operation. |
| NMI- | Non-Maskable Interrupt (NMI) Request. An NMI request is triggered by a falling edge on the NMI- input. NMI- may thereafter go high or remain low indefinitely without triggering a second NMI request. Use of this pin is restricted for debugging purposes. An NMI request is also generated when system RESET is asserted. A pullup device is implemented internal to adapter chip 24 to force NMI- to be deasserted if it is left unconnected. |
| TEST(0-5) | Test pin inputs for selecting test modes, master or slave operation or module-in-place mode and to enable and disable individual modules. The TEST pins are also used to select between token ring and ethernet mode. If these pins are left unconnected they float high and normal operation is selected. The values on test pins 0, 1 and 2 can be read in the CPSTS register. This allows a user to pass data to the adapter directly via the pins. The specific configurations and corresponding functions for the test pins are set forth immediately below. |

| TST5 | TST4 | TST3 | TST2 | TST1 | TST0 | Description |
|---|---|---|---|---|---|---|
| 1 | 0 | 0 | X | X | X | Module in place test mode. All output pins high impedance. |
| 1 | 1 | 1 | c | b | a | Normal adapter operation. a, b and c are visible in CPSTS register bits 5-7 and in ACTL TEST(0-2). During adapter reset (MRESET active), TST1 is sampled to configure protocol handler hardware for token ring or ethernet operation. For host control of network type (given both are available), this line will be tied to pin OUT1. |
| 1 | 1 | T | X | X | X | CPU dump and load. Parallel dump of CPU registers when T falls from 1 to 0 and parallel load of CPU registers when T rises from to 0 to 1. |
| 1 | 0 | 1 | X | X | X | One or more modules disabled. This allows faulty modules to be isolated and communications processor 32 to be disabled for slave operation of adapter chip 24. Isolating faulty modules is useful when debugging. |
| 0 | X | X | X | X | X | Any series of bits indicates one of various serial scan test modes. |

| Pin Designation | Signal(s) Description |
|---|---|
| XMATCH | If this input is asserted by an external device, adapter chip 24 copies the current frame to adapter memory if XFAIL is low. This active high signal has an internal pullup. |
| XFAIL | Used in conjunction with XMATCH. An input signal from an external address checker indicating it has failed to recognize a data frame. This active high signal has an internal pullup. If both XMATCH and XFAIL are asserted, XFAIL takes precedence. This means that if the pins are left unconnected, XFAIL is always asserted. |
| BTSTRP | Bootstrap. The value on this input pin is loaded into the BOOT bit of the ACTL register at reset to form a default value. This bit indicates whether chapter 0 and 31 are RAM or ROM. If RAM is indicated communications processor 32 is denied access to the bus until the CPHALT bit in ACTL is cleared. This pin has an internal pullup device to maintain a high voltage on it when it is not driven. |
| PRTYEN/SCAN0 | Parity Enable. The value on this input pin is loaded into the PRTYEN bit of the ACTL register at reset to form a default value. This bit enables parity checking for the adapter memory. This pin has an internal pullup device to maintain a high voltage on it when it is not driven. This pin is used as the SCAN0 input in the serial test modes. |
| OUT0/OUT1 | Adapter outputs controlled by host system 10 and used for adapter configuration. These pins are controlled by ACTL register bits OUT0 and OUT1. These bits can only be altered while adapter chip 24 is in RESET. For host software control of the network type and speed, OUT0 would be connected to TEST0 and OUT1 to TEST1. |

As stated above, the present embodiment provides a great deal of flexibility in networking a host computer or the like to either a token ring or ethernet network. However, under contemporary network technology, both token ring and ethernet systems involve various types of transmission media as well as alternative speeds. In the prior art, for each of these different media, a different type of physical connector was generally provided in order to interface a host computer to the network. For example, each different type of media would have a corresponding computer card which could be placed within a personal computer or the like, thereby providing a physical connector at the back of the machine in order to connect to the appropriate type of media provided by the network. As a result, however, it should be appreciated that in order to accommodate a particular type of network, a user was forced to change his or her network card to provide the appropriate type of interfacing device as well. Another aspect of the present embodiment, however, permits the user to interface his or her host computer to any of the above listed various types of network media without having to change a computer board or alter the plug on the computer each time a different media is encountered. Specifically, FIG. 6 includes yet another feature in order to permit the processor chip to communicate with various ones of these different types of medias and/or different types of speeds of communication.

Figure 6:
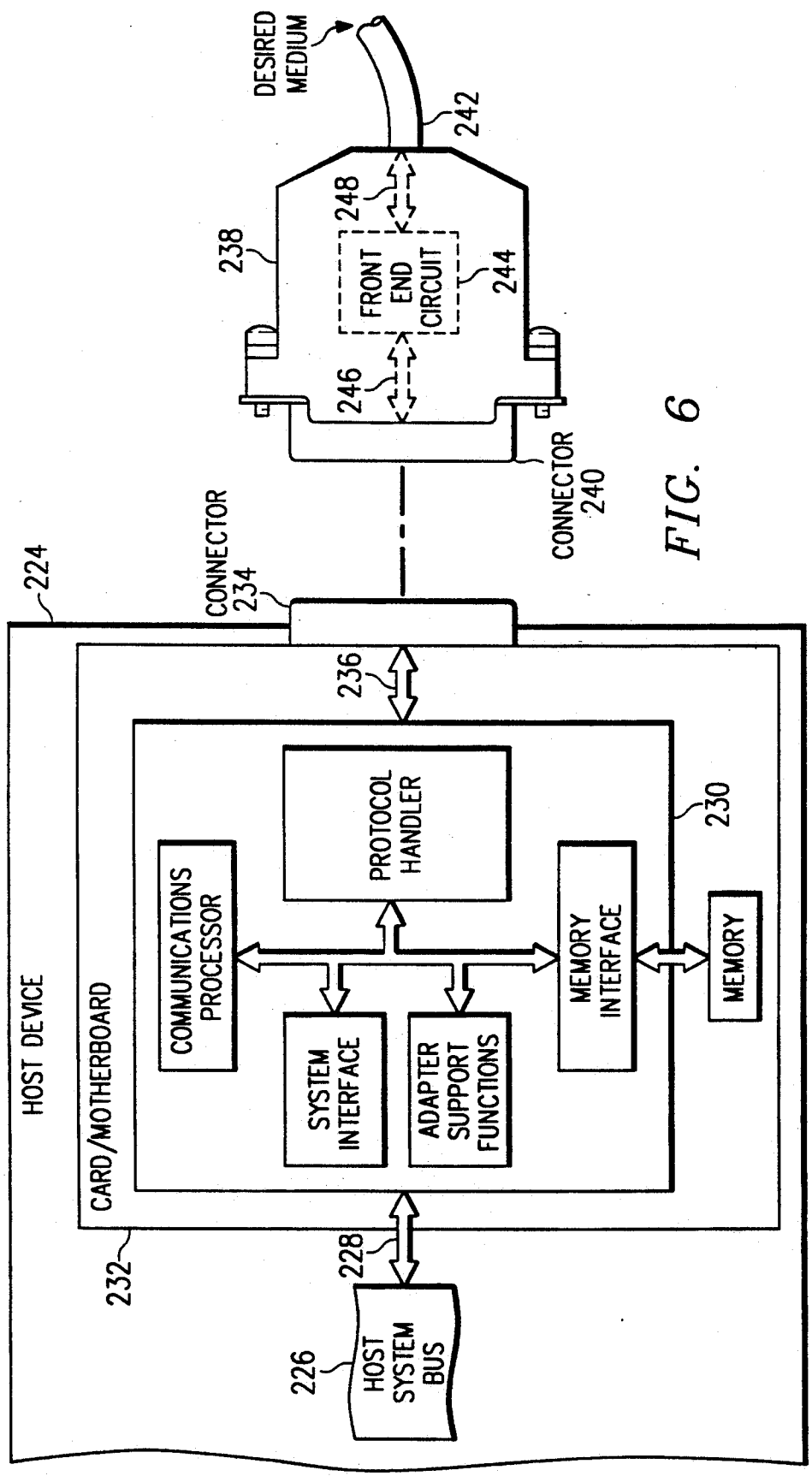
FIG. 6 illustrates a host device having an interface for coupling a network adapter circuit to a network front end circuit disposed within a plug member.

FIG. 6 illustrates a host device 224 which typically comprises a personal computer or computer work station. As is known in the art, the circuitry of host device 224 is typically enclosed by a metallic cabinet or the like. Host device 224 further includes an internal host system bus 226 which is representative of a bus, typically an address/data bus, used by the majority of components within host system 224.

Host system bus 226 is coupled via a connecting bus 228 to an adapter chip 230. Adapter chip 230 in the preferred embodiment is the same as adapter chip 24 illustrated in FIGS. 2, and 4a through 5. In the embodiment of FIG. 6, however, adapter chip 230 is disposed on either a computer card or a motherboard 232 existing within host device 224. Thus, for example, a user seeking to interface host device 224 to a network may select a computer card having an adapter chip 230 disposed on it and connect that card within host device 224. Alternatively, adapter chip 230 could be disposed on the motherboard of host device 224. Additionally, while not shown, certain minor glue logic, buffer circuitry and/or other minor supporting circuitry (i.e., miscellaneous hardware 28) as known in the art may be likewise disposed on the card/motherboard 232 to support adapter chip 230. In any case, adapter chip 230 is generally coupled to an external connector 234 via a connecting bus 236. Thus, it should be appreciated that host system bus 226 may communicate through the hardware and connections of computer card/motherboard 232 to external connector 234. In the preferred embodiment, external connector 234 comprises a three row forty-four pin D-type female connector.

Also illustrated in FIG. 6 is a plug member 238 having an external connector 240 disposed at one end and a communication medium 242 disposed at its other end. External connector 240 is matable with external connector 234 and, therefore, in the preferred embodiment, is a male three row forty-four pin D-type connector. The connector selection (DB44) is based on utilizing a connector that is unique to most personal computers such that it will not be confused with previous connectors, is based on a physical design that is already mass produced (DB25 parallel connector) to achieve economies of scale, and has an appropriate physical size to facilitate the network physical layer electronics in plug member 238.

Plug member 238 also includes an internal front end circuit 244 (shown in phantom). Front end circuit 244 is the same, or similar to, network front end circuit 26 discussed in connection with FIG. 1, above. Thus, front end circuit 244 may comprise any one of various different types of commercially available front end circuits. Each of these circuits are generally operable to provide the so-called "physical layer" functions necessary for a host device to communicate with a particular computer network.

Front end circuit 244 is coupled to connector 240 and cable 242 via buses 246 and 248, respectively. Bus 248 couples front end circuit 244 to any desired network medium such as one of the many types discussed above. Accordingly, it should be appreciated that plug member 238 may be displaced such that connectors 234 and 240 mate with one another, thereby creating a signal communication path between the electronic components of host device 224 and those of plug member 238. In particular, once plug member 238 is so disposed, host system bus 226 may communicate through adapter chip 230 to front end circuit 244, and ultimately to cable 242 which is connected to any one of various different desirable network media. As a result, the coupling of plug member 238 to host device 224 permits host device to communicate with whichever medium is chosen.

From a review of FIG. 6, it should, therefore, be appreciated that front end circuit 244 is effectively removed from the internal componentry of host device 224. Further, where host device 224 includes a novel and improved adapter chip 230 such as adapter chip 24, the configuration of FIG. 6 provides a great deal of flexibility for communicating with various different types of networks and various different types of communication media. In particular, where adapter chip 230 is operable to communicate with different types of networks and the different types of media, there is no need to make internal adjustments to host device 224 in order to accommodate any of those networks and/or media. Instead, the configuration of FIG. 6 permits the user to choose a particularized plug member 238 having the desired and necessary front end circuit without having to disturb the internal componentry of host device 224.

For example, if a user were interested in coupling a host device 224 to an ethernet network using an AUI communication media, a specific plug member 238 having the appropriate front end circuit 244 could be chosen in order to communicate with the ethernet protocol and physically connect to the AUI media. Because adapter chip 230 is versatile and permits such interaction, there is no need to disturb or alter the internal componentry of host device 224. This example is discussed in greater detail below in connection with FIG. 7. As an alternative, however, if the user of host device 224 desires to connect that device to a token ring network having a twisted pair communication media, a different plug device 238 having the appropriate front end circuitry could be selected to accommodate that network and media. Again, because adapter chip 230 provides the flexibility to communicate with various different types of networks and/or cabling media, there is no reason to disturb the componentry of host device 224 and the only hardware change and expense encountered is in the selection of plug member 238. Thus, from the above, it should be appreciated that the embodiment of FIG. 6 substantially reduces the labor and expense involved in configuring a host device to communicate with a specific type of computer network and/or network media.

In order to efficiently accomplish the matable connector configuration discussed above in connection with FIG. 6, still another aspect of the present embodiment involves the preferred selection of signals for the various interfaced lines which are connected to one another (via bus 236, connectors 234 and 240, and bus 246) when plug member 238 is plugged into connector 234. In other words, for the preferred use of both token ring and ethernet communications, various different signals are either required or desirable for a host system to communicate to/from the particular network. In order to permit efficient use of hardware, one aspect of the present embodiment includes the specific choice of signals on each of these lines. In particular, to connect to a typical ethernet network front end circuit, there are eight lines which are of paramount consideration. Similarly, in order to connect to a typical token ring front end circuit, there are twelve such lines. Thus, one approach would be to have twenty (i.e., twelve token ring plus eight ethernet) separate signal lines between connectors 234 and 240 to accommodate these signals. The preferred embodiment, however, generally implements various rules in order to permit certain of these different network signals to be paired on the same physical line and, therefore, reduces the number of overall signal lines and device complexity. Thus, a single line can carry either a token ring or ethernet signal without having to duplicate a large amount of hardware or create additional lines to support each line. The following guidelines were established in order to choose which signals were chosen to share a common hardware line.

First, signal lines were chosen to share both ethernet and token ring signals such that the respective signals were directed in the same direction. In other words, where a token ring signal line is an input, an ethernet input signal was chosen as well. This assurance of the same direction is preferable in order to avoid device problems which might otherwise occur from a signal inadvertently going the wrong direction. For example, if a token ring outgoing signal were inadvertently connected to a line producing an output, the two signals would collide and various device damage or network signal problems could occur.

A second criterion used in order to select which ethernet signal was placed on the same line with a token ring signal was made on the basis of network interaction during reset of the host machine or the network. In particular, when the host system is being powered up, there is no instantaneous means by which the host system can determine whether its communication will be with a token ring or an ethernet network. If the wrong type of protocol were established or assumed, and the signals were not isolated during reset, various destructive signals could be provided. For example, if a line were chosen to share a token ring input and an ethernet output, and the host system were to expect a token ring input during power up, an ethernet output during power up could provide at a minimum ambiguous results, and at a maximum could cause danger to the circuitry expecting the token ring input. Thus, for each of the multi-function lines wherein the line has a different function for either an ethernet or token ring network, each line was chosen such that the signal operation is appropriate during reset operation.

A third criterion generally used for establishing which ethernet and token ring signals were paired onto a same signal line was that of the particular function of the respective signals. In particular, certain signals were selected where their functions were either identical or analogous. For example, the PXTALIN signal of ethernet and the FETXC signal of token ring both correspond to the receipt of a reference clocking signal. As a result, these two functions were placed on the same signal line. Other examples are readily apparent from the description of the various signal functions set forth below.

In order to accomplish the matable connector configuration discussed above in connection with FIG. 6, still another aspect of the present embodiment involves the method of selecting the network type to be used where more than one option exists. This also has application where a connector scheme is not used and two separate network front ends are connected to adapter 24. It is also necessary to configure the adapter hardware to use the appropriate protocol (ethernet or token ring) required by the network.

In order to address these issues of selection and configuration, in the preferred embodiment there is a set of four physical lines connected to adapter 24: two selection signals output from adapter 24, and two configuration signals inputs. Specifically, selection outputs OUT0 and OUT1 from adapter 24 are directly controllable from host system 10 through the ACTL register in adapter 24. This allows the host to provide two signals to select between network types and speeds if this option exists. Thus, OUT0 and OUT1 may be connected to front end circuit (26 or 244) to indicate the desired protocol/speed. Further, adapter 24 has configuration inputs TEST0 and TEST1 which are connected to network front end circuit (26 or 244) and indicate the response of the front end circuit to selection outputs OUT0 and OUT1. TEST1 is used (during reset) to configure the protocol handler 38 hardware to use either token ring (TEST1=1) or ethernet (TEST1=0) protocols. TEST0 is used to configure communications processor 32 software timers for differences between the 4Mbit/s (TEST0=1) and 16Mbit/s (TEST1=0) token ring protocols. TEST0 and TEST1 signal values may be read by host system 10 through the ACTL register in the adapter 24.

Where a plug member 238 is only capable of a single network type or speed, its front end circuit 244 will ignore the selection signals OUT0 and OUT1, and return hardwired values on TEST0 and TEST1. If, on the other and, its front end circuit 244 supports different speeds or network types, it will respond to selection signals OUT0 and OUT1 as appropriate and signal back its configuration in response on TEST0 and TEST1. As OUT0 and OUT1 are setable, and TEST0 and TEST1 are readable by host system 10, it should be appreciated that host system 10 can determine which options are supported by front end circuit 244. This is achieved by simply setting each combination of OUT0 and OUT1 in turn and monitoring the returned values on TEST0 and TEST1 to determine which are supported by front end circuit 244. This allows maximum flexibility in network selection and configuration supporting both systems that are fully selectable by the host computer 10, or systems that are fully configured by the plug member 238, or any combination in between.

Returning to the above three signal-choice criteria, certain signal lines between connectors 234 and 240 carry either an ethernet or a token ring signal, depending on the mode of operation for adapter chip 230 and the particular front end circuit 244 selected. The remaining signal lines were selected using various other criteria. The following is a pin-by-pin listing followed by the function of the signal or signals communicated through the pins of connectors 234 and 240.

| Pin | Signal Description |
|---|---|
| 1 | No Hood Detect Ground |
| 2 | Ground |
| 3 | Ground |
| 4 | Power 5V |
| 5 | Power-12V |
| 6 | Gated Ring Clock (8Mhz/32Mhz) |
| 7 | Non-Gated Ring Clock (8Mhz/32Mhz) |
| 8 | Network Select 2 (Out0) |
| 9 | Network Select 1 (Out1) |
| 10 | Network Select 0 |
| 11 | Power +12V |
| 12 | Power 5V |
| 13 | Ground |
| 14 | Ground |
| 15 | Ground |
| 16 | FEDRVR- |
| 17 | FEDRVR |
| 18 | FEWRAP-/FETXEN |
| 19 | FENSRT-/FELPBK |
| 20 | FEFRAQ/FETXD |
| 21 | PXTALIN/FETXC |
| 22 | Selected Network 3 |
| 23 | Selected Network 2 (Test0) |
| 24 | Selected Network 1 (Test1) |
| 25 | Selected Network 0 (Text2) |
| 26 | No Hood detect |
| 27 | FEWFLT-/FECOLL |
| 28 | FEREDY-/FECSN |
| 29 | FERCVR/FERXD |
| 30 | FERCLK/FERXC |
| 31 | reserved |
| 32 | reserved |
| 33 | reserved |
| 34 | reserved |
| 35 | reserved |
| 36 | reserved |
| 37 | reserved |
| 38 | reserved |
| 39 | reserved |
| 40 | reserved |
| 41 | reserved |
| 42 | reserved |
| 43 | reserved |
| 44 | reserved |

INTERFACE CONNECTOR SIGNAL DESCRIPTION(S)

Ground (pins 2-3, 13-15)—Output from adapter 230. Power supply 0 Volt reference.

Power 5V (pins 4,12)—Output from adapter 230. Power supply 5 Volt.

Power −12V (pin 5)—Output from adapter 230. Power supply −12 Volt.

Power +12V (pin 11)—output from adapter 230. Power supply +12 Volt.

No Hood detect (pin 26)—Input to system. This pin is used by the system to detect that a plug member 238 is inserted in connector 234. This pin should be connected to pin 1 (No Hood Detect Gnd) on plug member 238. On the host side of the connector, it is connected to 5V through a 10K ohm resistor. This signal can be used on the host side of the interface to disable any buffer logic, etc. when no header is connected, thereby reducing power consumption.

No Hood detect Ground (pins 1-3, 13-15)—Output from adapter 230. Power supply 0 Volt reference. This signal should be kept isolated from the other Ground pins. It should be connected to Pin 26 (No Hood Detect) on plug member 238.

Gated Ring Clock (8Mhz/32Xhz) (pin 6)—Output from adapter 230. A buffered 8/32 Mhz clock gated with FRAQ that Beets the crystal input specifications of the TMS38053 front end circuit for 4/16Mbit/S token ring. Ungated Ring Clock (8Mhs/32Mhs) (pin 7)—Output from adapter 230. A buffered 8/32 Mhz clock that meets the PXTALIN input specs for 4/16Mbit/S token ring.

Network Select (0-2) (pins 10-8)—Output from adapter 230. These pins select or attempt to select the type of network (or network speed) to be provided by front end circuit 244. These signals are a request from adapter 230 for a type of network configuration. In the preferred embodiment, network selection is accomplished as follows.

| NS0 | NS1 | NS2 | NS3 | |
|---|---|---|---|---|
| X | X | X | 0 | Reserved |
| 0 | X | X | 1 | Reserved |
| 1 | 0 | 0 | 1 | Ethernet (blue book) |
| 1 | 0 | 1 | 1 | Ethernet (IEEE802.3) |
| 1 | 1 | 0 | 1 | 16 Mbit/S Token Ring |
| 1 | 1 | 1 | 1 | 4 Mbit/S Token Ring |

Selected Newark (0—3) (pins 25-22)—Input to adapter 230. These pins indicate the type of network (or network speed) actually provided by front end circuit 244.

PEDRVR- (pin 16)—Output from adapter 230. Buffered version of adapter 230 FEDRVR- pin. Used only by token ring front end circuit.

PEDRVR (pin 17)—Output from adapter 230. Buffered version of adapter 230 FEDRVR pin. Used only by token ring front end circuit 244.

FEWRAP-/FETXEN (pin 18)—output from adapter 230. Buffered version of Adapter FEWRAP-/FETXEN pin.

For token ring, this signal drives the FEWRAP pin. Specifically, this signal indicates to front end circuit 244 that data transmitted from adapter 230 to front end circuit 244 should be returned to adapter 230 without transmitting the data to the token ring network.

For ethernet, this signal drives the SIA TXEN pin. Specifically, this signal indicates to front end circuit 244 that data transmitted from adapter 230 to front end circuit 244 should be transmitted to the ethernet network.

PENSRT-/PELPB - (pin 19)—Output from adapter 230. Buffered version of adapter 230 FENSRT-/FELPBK- pin.

For token ring this signal drives the adapter 230 FENSRT- pin. Specifically, this signal indicates to front end circuit 244 that adapter 230 is currently operable to be actively coupled to the network for communication to the network.

For ethernet this signal drives the SIA LPBK- pin. Specifically, this signal indicates to front end circuit 244 that data transmitted from adapter 230 to front end circuit 244 should be returned to adapter 230 without transmitting the data to the network.

PEPMQ/72TXD (pin 20)—Output from adapter 230. Buffered version of adapter 230 FEFRAQ/FETXD pin.

For token ring this signal drives the Falcon FEFRAQ pin. Front end circuit 244 includes a phase locked loop operable during communications with a token ring network to synchronize with a signal on the network. This signal indicates to front end circuit 244 that the phase locked loop should synchronize with a clock signal provided by adapter 230 rather than the signal on the network.

For ethernet this signal drives the SIA TXD pin. Specifically, this signal provides data to the front end circuit 244.

PXTALIN/PETXC (pin 21)—Input to adapter 230. This signal will be buffered and then drive the adapter PXTALIN/FETXC pin.

This input signal is a crystal clock signal. Thus, for a 4Mbit/S token-ring this signal must provide an 8Mhz clock, and for a 16Mbit/S token ring, this signal must provide an 32Mhz clock.

This input signal is a crystal clock signal for synchronizing the transmission rate of data transmission from adapter circuit 230 to front end circuit 244. Specifically, for an ethernet 802.3 network this signal must provide a 10 MHz clock.

PEWPLT-/PZCOLL (pin 27)—Input to adapter 230. This signal will be buffered and then drive the adapter FEWFLT-/FECOLL pin. For token ring this signal should be driven by the FENWFLT-pin of adapter chip 230. Thus, the received signal indicates an error of operation on the network. For ethernet this signal should be driven by SIA COLL pin. Thus, the received signal indicates a collision of data on the network.

PEREDY-/PZCSN (pin 28)—Input to adapter 230. This signal will be buffered and then drive the adapter FEREDY-/FECSN pin. For token ring this signal should be driven by the FEREDY- pin of adapter chip 230. Thus, the received signal indicates that front end circuit 244 has synchronized its operation with a crystal clock. For ethernet this signal should be driven by SIA CSN pin. Thus, the received signal indicates that front end circuit 244 has received a carrier signal.

PERCVR/PMM (pin 29)—Input to system. This signal will be buffered and then drive the adapter FERCVR/FERXD pin. For token ring this signal should be driven by the FERCVR pin of adapter 230. Thus, the received signal represents data received from network front end circuit 244. For ethernet this signal should be driven by SIA RXD pin. Thus, the received signal represents data received from network front end circuit 244.

PERCLK/PERXC (pin 30)—Input to adapter 230. This signal will be buffered and then drive the adapter FERCLK/FERXC pin. For token ring this signal should be driven by the FERCLK- pin of adapter 230. Thus, the received signal represents a clock signal representative of the rate data will be received from front end circuit 244. For ethernet this signal should be driven by SIA RXC pin. Thus, the received signal represents a clock signal representative of the rate data will be received from front end circuit 244.

reserved (pins 22, 26, 31–44)

The above-listed interface lines of the preferred embodiment support both the IEEE 802.3 CSMA/CD BUS and ethernet network and the IEEE 802.5 token ring network. Further, the interfaced lines support the following network cabling media and physical layers (i.e., provided by an appropriate front end circuit) in conjunction with adapter chip 230:

IEEE 802.3 or Ethernet COAX (AUI)
IEEE 802.3 or Ethernet THINNET
IEEE 802.3 10BaseT Twisted Pair
IEEE 802.5 4 ubps Shielded Twisted Pair
IEEE 802.5 4 mbps Unshielded Twisted Pair
IEEE 802.5 4 mbps Fiber
IEEE 802.5 16 mbps Shielded Twisted Pair
IEEE 802.5 16 mbps Unshielded Twisted Pair
IEEE 802.5 16 mbps Fiber
IEEE 802.5 16/4 mbps Shielded Twisted Pair
IEEE 802.5 16/4 mbps Unshielded Twisted Pair
IEEE 802.5 16/4 mbps Fiber From the above, it should be appreciated that the preferred embodiments provide a single processor solution that supports the industry standard interface front end chips for token ring (Texas Instruements' TMS38053 and TMS38054 Ring Interface Chips) and ethernet (National Semiconductor 8391 type interface). Through minimum selection logic as known in the art, adapter chip 230 can be configured to attach to any front end circuit physical layer interface derived from these chips. Also, via firmware intelligence, adapter chip 230 can automatically configure itself to run the appropriate network protocol (token ring or ethernet) required by the physical interface. As such, the interface is the definition of a universal interface and connector that allows this standard universal network connection to be placed on the back of a host system cabinet or card and support either ethernet or token ring with any of the network physical layers mentioned. As another feature, the processor automatically configures itself once the cable is attached to run the appropriate network protocol at the appropriate speed.

Figure 7:
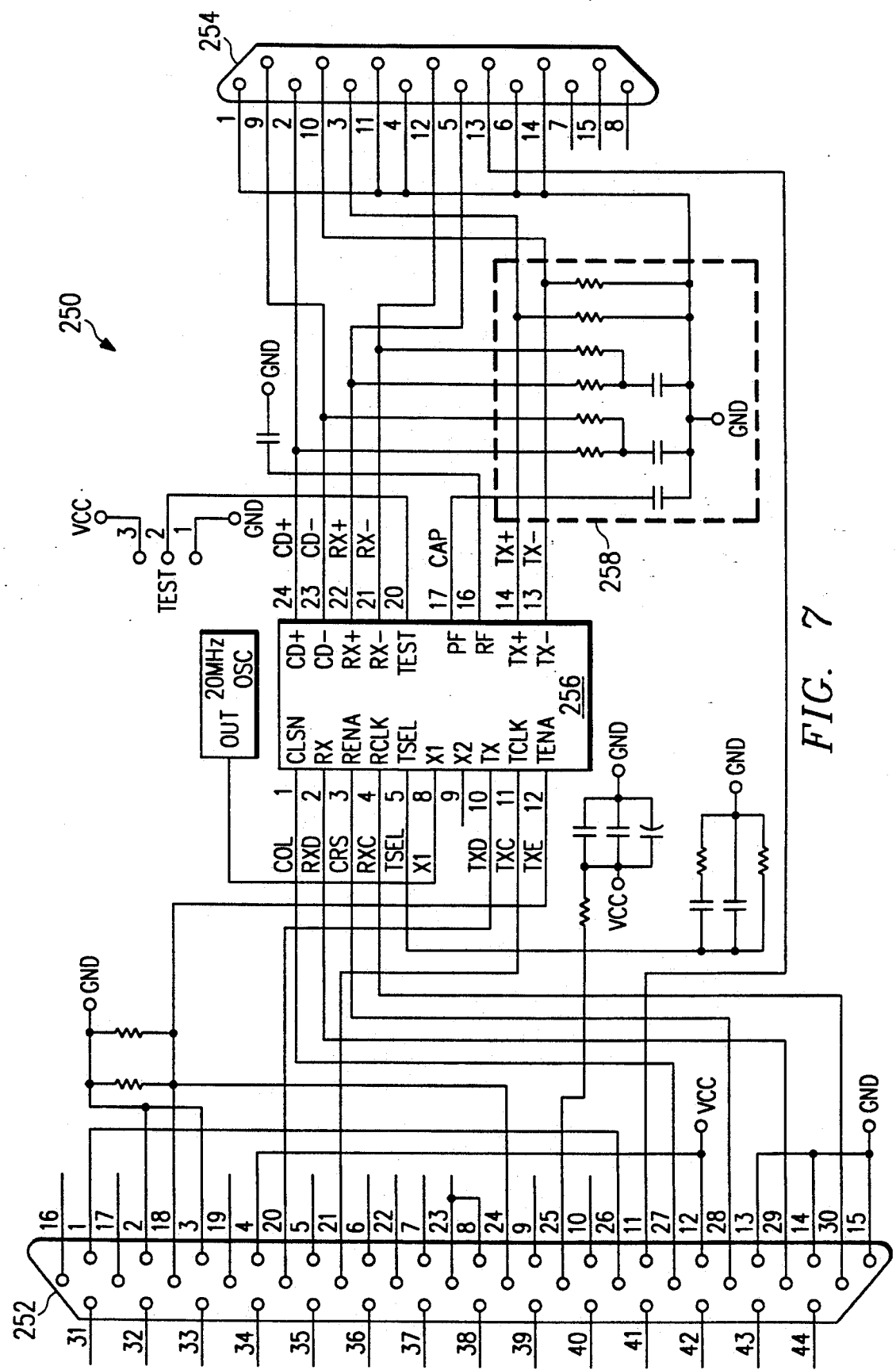
FIG. 7 illustrates a schematic of a front end circuit disposed within a plug member as illustrated in FIG. 6.

FIG. 7 illustrates one embodiment of the internal circuitry of a plug member 250. Plug member 250 is generally a like configuration of plug member 238 illustrated and described in connection with FIG. 6 above. Accordingly, plug member 250 includes a male connector 252 for coupling to a connector on a host device. In the preferred embodiment, male connector 252 comprises a three row D-44 pin connector. As an alternative to the configuration illustrated in FIG. 6, however, plug member 250 further includes a second connector 254. Connector 254 is used in lieu of a physical connection to a transmission medium such as that shown in FIG. 6. As a result, a network medium having a connector which is matable to connector 254 may be plugged into connector 254. Thus, it should be appreciated that plug member 250 may be inserted between a connector on a host device and a network communication medium having a connector which is matable with connector 254. In the preferred embodiment, connector 254 comprises a female DB-15 connector. In particular, plug member 250 is operable to couple a host device to an ethernet network utilizing an AUI medium.

Plug member 250 further includes a front end chip 256. Front end chip 256 may comprise any one of many commercially available or yet to be developed front end network circuits. Each of these circuits are available for providing the physical layer of communication between a network and a network adaptive circuit. In the embodiment illustrated in FIG. 7, front end chip 256 comprises an AM7992B chip commercially available from Advanced Micro Devices. This chip is operable to interface a network adaptive circuit to an ethernet network which utilizes an AUI communication medium.

Plug member 250 further includes a biasing circuit 258 (various components illustrated as enclosed by a phantom line). Biasing circuit 258 includes a plurality of resistors and capacitors connected as shown for purposes of biasing the AUI communication medium which will be coupled to connector 254. The specific additional interconnections of front end chip 256 between connectors 252 and 254 are illustrated in FIG. 7 according to the pin designations either by numeral or signal name as shown.

While FIG. 7 illustrates a plug member 250 having front end chip 256 as operable for an ethernet network using an AUI communication media, it should be understood that one skilled in the art could choose alternative front end circuits to accommodate other types of media used with ethernet networks, or other front end circuits operable to interact with communication media and protocol used with token ring networks as well.

While the present embodiments have been described in detail, it should be understood that a person of skill in the art could make numerous modifications, substitutions and/or alterations to these embodiments without departing from the scope and spirit of those embodiments, as further defined by the following claims.

What is claimed is:

1. A signal interface for coupling a network front end circuit to a network adapter circuit, wherein the network front end circuit communicates with a network, comprising:
   a plurality of input signal lines, each operable to conduct an input signal from the front end circuit to the network adapter circuit; and
   a plurality of output signal lines, each operable to conduct an output signal from the network adapter circuit to the network front end circuit, wherein selected ones of said input and output signal lines are functional to support both a token ring protocol and "ETHERNET" protocol on the same line, and wherein only input signals are input on said selected input lines and only output signals are output on said selected output lines.

2. The interface of claim 1 wherein one of said selected output signal lines is operable to support said first network protocol by indicating to the network front end circuit that data transmitted from the network adapter circuit to the network front end circuit should be returned to the network adapter circuit without transmitting the data to the network, and is operable to support said second network protocol by indicating to the network front end circuit that data transmitted from the network adapter circuit to the network front end circuit should be transmitted to the network.

3. The interface of claim 1 wherein one of said selected output signal lines is operable to support said first network protocol by indicating to the network front end circuit that the network adapter circuit is currently operable to be actively coupled from communication to the network, and is operable to support said second network protocol by indicating to the network front end circuit that data transmitted from the network adapter circuit to the network front end circuit should be returned to the network adapter circuit without transmitting the data to the network.

4. The interface of claim 1 wherein the network front end circuit comprises a phase lock loop operable in a first mode to synchronize with a signal on the network, and wherein one of said selected output signal lines is operable to support said first network protocol by indicating to the network front end circuit that said phase lock loop should synchronize with a clock signal provided by said network adapter circuit rather than said signal on the network, and is operable to support said second network protocol by providing data to the network front end circuit.

5. The interface of claim 1 wherein one of said selected input signal lines is operable to support said first network protocol by receiving a crystal clock signal, and is operable to support said second network protocol by receiving a crystal clock signal for synchronizing the transmission rate of data transmission from the network adapter circuit to the network front end circuit.

6. The interface of claim 1 wherein one of said selected input signal lines is operable to support said token ring protocol by receiving a signal representing an error of operation on the network, and is operable to support said "ETHERNET" protocol by receiving a signal representing a collision of data has occurred on the network.

7. The interface of claim 1 wherein one of said selected input signal lines is operable to support said token ring protocol by receiving a signal representing that the front end circuit has synchronized its operation with a crystal clock, and is operable to support said "ETHERNET" protocol by receiving a signal representing that the front end circuit has received a carrier signal.

8. The interface of claim 1 wherein one of said selected input signal lines is operable to support said token ring protocol by receiving data from the network front end circuit, and is operable to supporting said "ETHERNET" protocol by receiving data from the network front end circuit.

9. The interface of claim 1 wherein one of said selected input signal lines is operable to support said token ring protocol by receiving a clock signal representative of the rate data will be received from the network front end circuit, and is operable to support said "ETHERNET" protocol by receiving a clock signal representative of the rate data will be received from the network front end circuit.

10. A signal interface for coupling a network front end circuit to a network adapter circuit, wherein the network front end circuit communicates with a network, comprising:
    a plurality of input signal lines, each operable to conduct an input signal from the front end circuit to the network adapter circuit; and
    a plurality of output signal lines, each operable to conduct an output signal from the network adapter circuit to the network front end circuit, wherein selected ones of said input and output signal lines are functional to support both a first and second network protocol on the same line, wherein only input signals are input on said selected input lines and only output signals are output on said selected output lines, and wherein one of said selected output signal lines is operable to support said first network protocol by indicating to the network front end circuit that data transmitted from the network adapter circuit to the network front end circuit should be returned to the network adaptor circuit without transmitting the data to the network, and is operable to support said second network protocol by indicating to the network front end circuit that data transmitted from the network adapter circuit to the network front end circuit should be transmitted to then network.

11. A signal interface for coupling a network front end circuit to a network adapter circuit, wherein the network front end circuit communicates with a network, comprising:
- a plurality of input signal lines, each operable to conduct an input signal from the front end circuit to the network adapter circuit; and
- a plurality of output signal lines, each operable to conduct an output signal from the network adapter circuit to the network front end circuit, wherein selected ones of said input and output signal lines are functional to support both a first and second network protocol on the same line, wherein only input signals are input on said selected input lines and only output signals are output on said selected output lines, and wherein one of said selected output signal lines is operable to support said first network protocol by indicating to the network front end circuit that the network adapter circuit is currently operable to be actively coupled from communication to the network, and is operable to support said second network protocol by indicating to the network front end circuit that data transmitted from the network adapter circuit to the network front end circuit should be returned to the network adapter circuit without transmitting the data to the network.

12. A signal interface for coupling a network front end circuit to a network adapter circuit, wherein the network front end circuit communicates with a network, comprising:
- a plurality of input signal lines, each operable to conduct an input signal from the front end circuit to the network adapter circuit; and
- a plurality of output signal lines, each operable to conduct an output signal from the network adapter circuit to the network front end circuit, wherein selected ones of said input and output signal lines are functional to support both a first and second network protocol on the same line, wherein only input signals are input on said selected input lines and only output signals are output on said selected output lines, wherein the network front end circuit comprises a phase lock loop operable in a first mode to synchronize with a signal on the network, and wherein one of said selected output signal lines is operable to support said first network protocol by indicating to the network front end circuit that said phase lock loop should synchronize with a clock signal provided by said network adapter circuit rather than said signal on the network, and is operable to support said second network protocol by providing data to the network front end circuit.

13. A signal interface for coupling a network front end circuit to a network adapter circuit, wherein the network front end circuit communicates with a network, comprising:
- a plurality of input signal lines, each operable to conduct an input signal from the front end circuit to the network adapter circuit; and
- a plurality of output signal lines, each operable to conduct an output signal from the network adapter circuit to the network front end circuit, wherein selected ones of said input and output signal lines are functional to support both first and second network protocol on the same line, wherein only input signals are input on said selected input lines and only output signals are output on said selected output lines, and wherein one of said selected input signal lines is operable to support said first network protocol by receiving a crystal clock signal, and is operable to support said second network protocol by receiving a crystal clock signal for synchronizing the transmission rate of data transmission from the network adapter circuit to the network front end circuit.

* * * * *